US010685167B1

(12) United States Patent
Lepère et al.

(10) Patent No.: US 10,685,167 B1
(45) Date of Patent: Jun. 16, 2020

(54) SYSTEM, METHOD, AND COMPUTER PROGRAM PRODUCT FOR DISPLAYING BUMP LAYOUT FOR MANUFACTURING VARIATIONS

(71) Applicant: Cadence Design Systems, Inc., San Jose, CA (US)

(72) Inventors: Jean-François Alain Lepère, Le Versoud (FR); Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/147,832

(22) Filed: Sep. 30, 2018

(51) Int. Cl.
*G06F 30/398* (2020.01)
*G06F 3/0484* (2013.01)
*G06F 119/18* (2020.01)
*G06F 111/04* (2020.01)
*G06F 111/20* (2020.01)

(52) U.S. Cl.
CPC ........ *G06F 30/398* (2020.01); *G06F 3/04845* (2013.01); *G06F 2111/04* (2020.01); *G06F 2111/20* (2020.01); *G06F 2119/18* (2020.01)

(58) Field of Classification Search
CPC .. G06F 17/5081; G06F 3/04845; G06F 17/50; G06F 3/0484; G06F 2217/02; G06F 2217/12; G06F 2217/06; G06F 30/398; G06F 2119/18; G06F 2111/04; G06F 2111/20; G06F 111/04; G06F 111/20
See application file for complete search history.

(56) References Cited

U.S. PATENT DOCUMENTS

| | | | | |
|---|---|---|---|---|
| 7,441,208 B1* | 10/2008 | Padalia | ............... | G06F 17/5068 716/106 |
| 2003/0005401 A1* | 1/2003 | Wimer | ............... | G06F 17/5068 716/112 |
| 2004/0121522 A1* | 6/2004 | Mertol | ............. | H01L 21/76838 438/125 |
| 2005/0028123 A1* | 2/2005 | Pekin | .................. | G06F 17/5068 716/119 |
| 2014/0117535 A1* | 5/2014 | Daubenspeck | ..... | H01L 23/3114 257/737 |
| 2018/0046746 A1* | 2/2018 | Clevenger | ........... | G06F 17/5081 |
| 2018/0174981 A1* | 6/2018 | Lu | ........................ | H01L 23/13 |

* cited by examiner

*Primary Examiner* — Vuthe Siek
(74) *Attorney, Agent, or Firm* — Mark H. Whittenberger, Esq.; Holland & Knight LLP

(57) ABSTRACT

The present disclosure relates to a computer-implemented method for use in design for manufacturing associated with a die or package. Embodiments may include providing, using a processor, an electronic design and displaying, at a graphical user interface, at least a portion of a layout associated with the electronic design. Embodiments may also include determining an expected thermal or centrifuge force manufacturing variation associated with the electronic design. Embodiments may further include allowing a user to insert, at the graphical user interface prior to signoff, a copper pillar bump or solder bump on at least a portion of the layout based upon, at least in part, the determined expected thermal or centrifuge force manufacturing variation. Embodiments may further include displaying the copper pillar bump or the solder bump on the layout at the graphical user interface.

14 Claims, 29 Drawing Sheets

SYSTEM, METHOD, AND COMPUTER PROGRAM PRODUCT FOR DISPLAYING BUMP LAYOUT FOR MANUFACTURING VARIATIONS

TECHNICAL FIELD

The present disclosure relates to electronic circuit design, and more specifically, to design for manufacturing that accounts for manufacturing variations. Embodiments included herein may improve the design for manufacturing of flip-chip design packages with copper-pillar, or solder bumps.

Discussion of the Related Art

In existing electronic circuit design systems it may be possible to operate upon both a package layout and a die layout. Traditionally, on the layout of the die, only the bump opening is represented, typically on the top-most metal, or passivation layer. Similarly on the package side only a small part of the bump footprint is represented on the layout. This is generally aligned with the die bump footprint, which is not the top bump dimension.

SUMMARY

In one or more embodiments of the present disclosure, a computer-implemented method for use in design for manufacturing associated with a die or package is provided. The method may include providing, using a processor, an electronic design and displaying, at a graphical user interface, at least a portion of a layout associated with the electronic design. The method may also include determining an expected thermal or centrifuge force manufacturing variation associated with the electronic design and allowing a user to insert, at the graphical user interface prior to signoff, a copper pillar bump or solder bump on the at least a portion of the layout based upon, at least in part, the determined expected thermal or centrifuge force manufacturing variation. The method may further include displaying the copper pillar bump or the solder bump on the layout at the graphical user interface.

One or more of the following features may be included. In some embodiments, displaying at least a portion of the layout or displaying the copper pillar bump or the solder bump may be associated with a die layout. Displaying at least a portion of the layout or displaying the copper pillar bump or the solder bump may be associated with a package layout. Inserting may occur after a physical verification step has identified one or more design rules violations. Inserting may include determining an actual placement of the copper pillar bump or solder bump on the layout. Inserting may include determining an actual physical dimension of the copper pillar bump or solder bump on the layout. The actual physical dimension may include at least one of offset, rotation, or spread factor.

In one or more embodiments of the present disclosure, a system having a computing device including at least one processor for use in design for manufacturing associated with a die or package is provided. The at least one processor may be configured to provide an electronic design and display, at a graphical user interface, at least a portion of a layout associated with the electronic design. The at least one processor may be configured to determine an expected thermal or centrifuge force manufacturing variation associated with the electronic design. The at least one processor may be further configured to allow a user to insert, at the graphical user interface prior to signoff, a copper pillar bump or solder bump on the at least a portion of the layout based upon, at least in part, the determined expected thermal or centrifuge force manufacturing variation. The at least one processor may be further configured to display the copper pillar bump or the solder bump on the layout at the graphical user interface.

One or more of the following features may be included. In some embodiments, displaying at least a portion of the layout or displaying the copper pillar bump or the solder bump may be associated with a die layout. Displaying at least a portion of the layout or displaying the copper pillar bump or the solder bump may be associated with a package layout. Inserting may occur after a physical verification step has identified one or more design rules violations. Inserting may include determining an actual placement of the copper pillar bump or solder bump on the layout. Inserting may include determining an actual physical dimension of the copper pillar bump or solder bump on the layout. The actual physical dimension may include at least one of offset, rotation, or spread factor.

In yet another embodiment of the present disclosure a non-transitory computer readable medium having stored thereon instructions that when executed by a processor result in one or more operations for use in design for manufacturing associated with a die or package is provided. Operations may include providing, using a processor, an electronic design and displaying, at a graphical user interface, at least a portion of a layout associated with the electronic design. Operations may also include determining an expected thermal or centrifuge force manufacturing variation associated with the electronic design and allowing a user to insert, at the graphical user interface prior to signoff, a copper pillar bump or solder bump on the at least a portion of the layout based upon, at least in part, the determined expected thermal or centrifuge force manufacturing variation. Operations may further include displaying the copper pillar bump or the solder bump on the layout at the graphical user interface.

One or more of the following features may be included. In some embodiments, displaying at least a portion of the layout or displaying the copper pillar bump or the solder bump may be associated with a die layout. Displaying at least a portion of the layout or displaying the copper pillar bump or the solder bump may be associated with a package layout. Inserting may occur after a physical verification step has identified one or more design rules violations. Inserting may include determining an actual placement of the copper pillar bump or solder bump on the layout. Inserting may include determining an actual physical dimension of the copper pillar bump or solder bump on the layout. The actual physical dimension may include at least one of offset, rotation, or spread factor.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
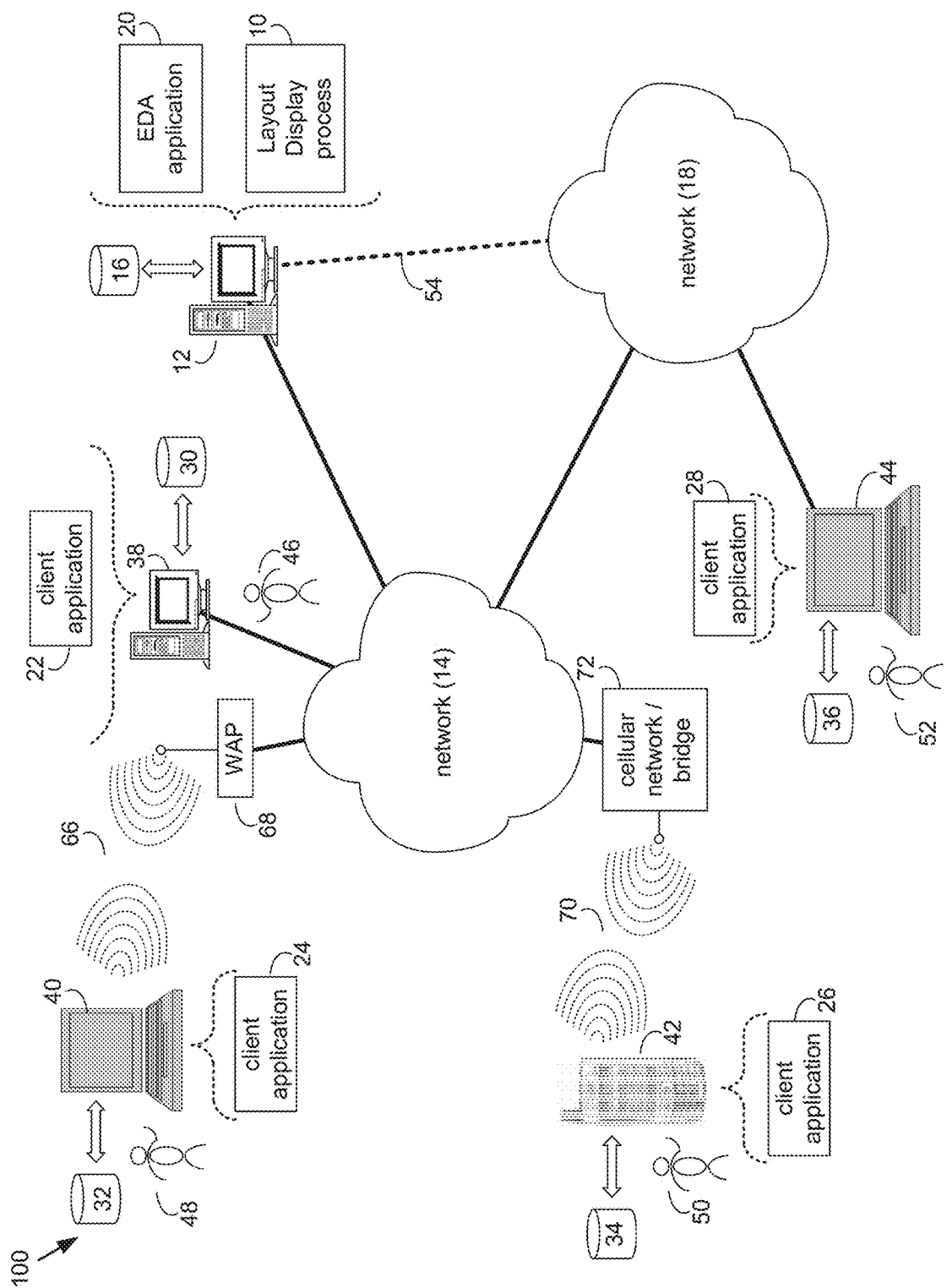
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer- usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, and Verilog-AMS. Various other hardware description languages may also be used as well.

Referring to FIG. 1, there is shown layout display process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the layout display process 10 may reside on and be executed, in whole or in part, by a client electronic device, such as a personal computer, notebook computer, personal digital assistant, or the like.

The instruction sets and subroutines of layout display process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS , Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example. As such, it should be noted that some or all of the operations associated with layout display process 10 may occur, in whole or in part, in the cloud.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Layout display process 10 may be a stand alone application, or may be an applet/application/script that may interact with and/or be executed within EDA application 20. In addition/as an alternative to being a server-side process, the layout display process may be a client-side process (not shown) that may reside on a client electronic device (described below) and may interact with an EDA client application (e.g., one or more of EDA client applications 22, 24, 26, 28). Further, the layout display process may be a hybrid server-side/client-side process that may interact with EDA application 20 and an EDA client application (e.g., one or more of client applications 22, 24, 26, 28). As such, the layout display process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize layout display process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
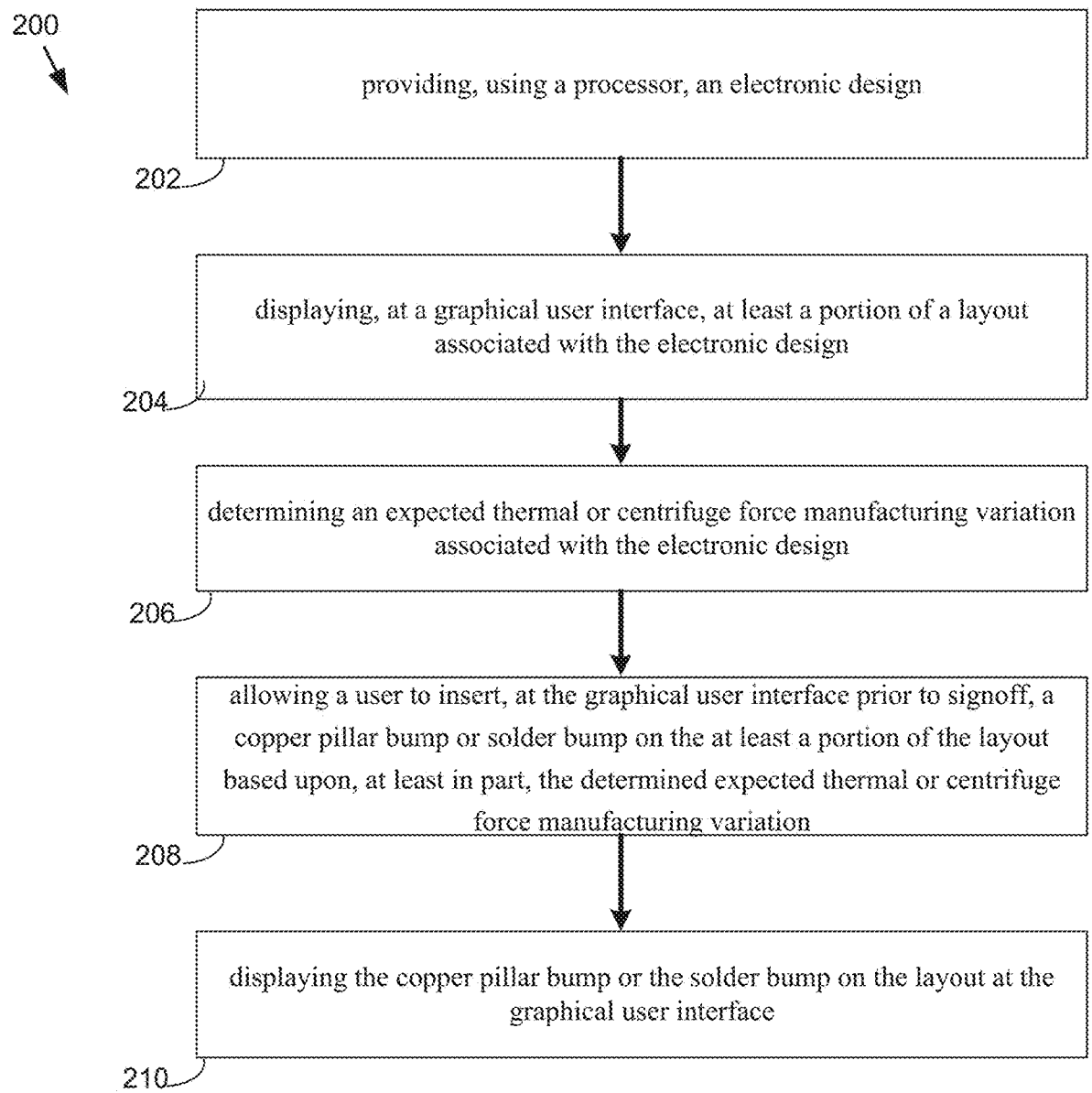
FIG. 2 is a flowchart depicting operations incorporating the layout display process in accordance with an embodiment of the present disclosure.

Referring now to FIG. 2, an example flowchart depicting operations consistent with an embodiment of layout display process 10 is provided. Layout display process 10 may be used in a design for manufacturing application such as those associated with a die or package. The method may include providing (202), using a processor, an electronic design and displaying (204), at a graphical user interface, at least a portion of a layout associated with the electronic design. The method may further include determining (206) an expected thermal or centrifuge force manufacturing variation associated with the electronic design. The method may also include allowing (208) a user to insert, at the graphical user interface prior to signoff, a copper pillar bump or solder bump on the at least a portion of the layout based upon, at least in part, the determined expected thermal or centrifuge force manufacturing variation. The method may further include displaying (210) the copper pillar bump or the solder bump on the layout at the graphical user interface.

Figure 3:
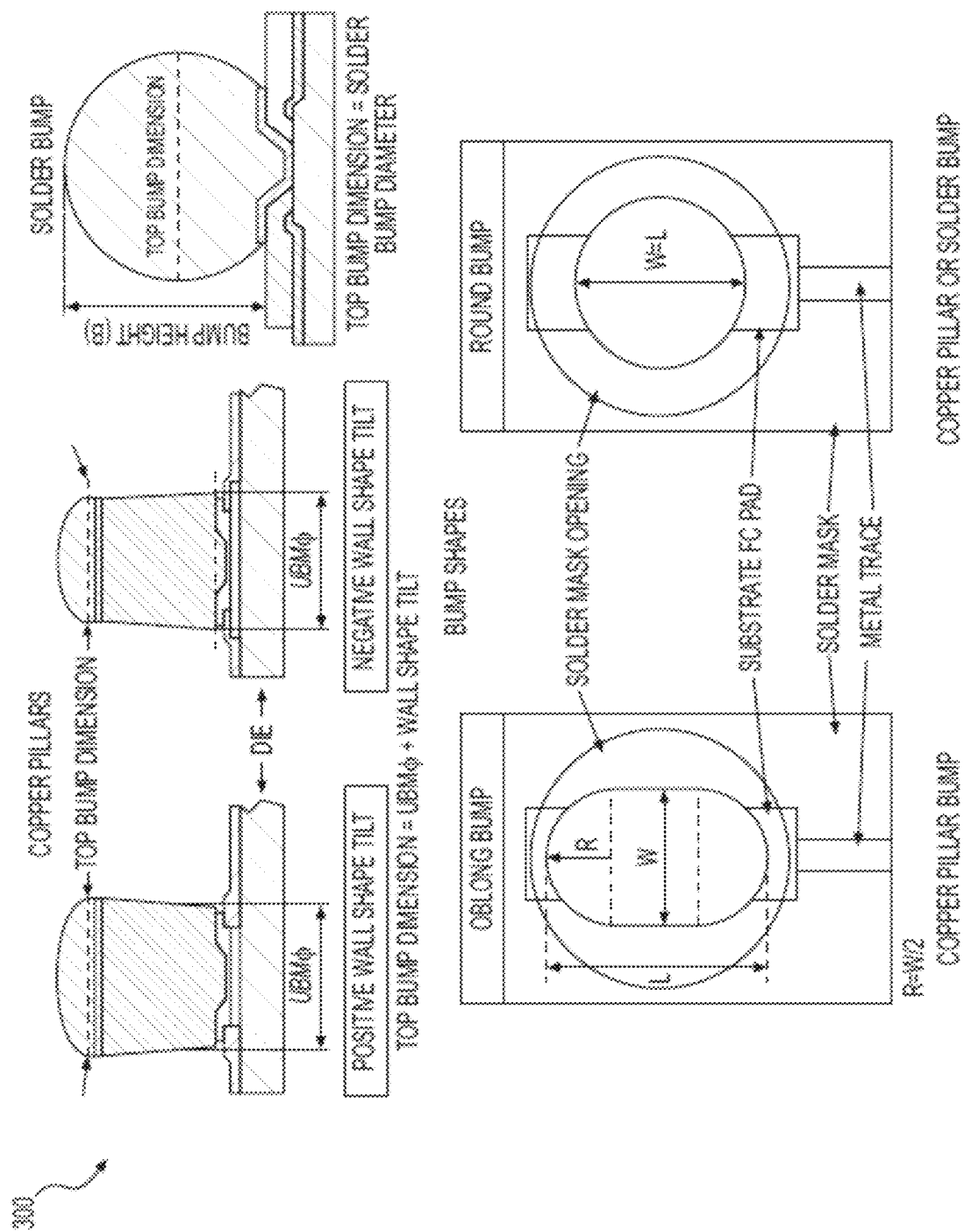
FIG. 3 is a diagram depicting copper pillars, solder bumps, and bump shapes in accordance with an embodiment of the present disclosure.

As technology advances both manufacturing and design complexity grow. Designs are being scaled down to meet the ever-increasing demand for more functionality contained in a single chip. This is the case for next generation bump technology for greater density (e.g. with copper pillar bumps) as shown in FIG. 3.

Figure 4:
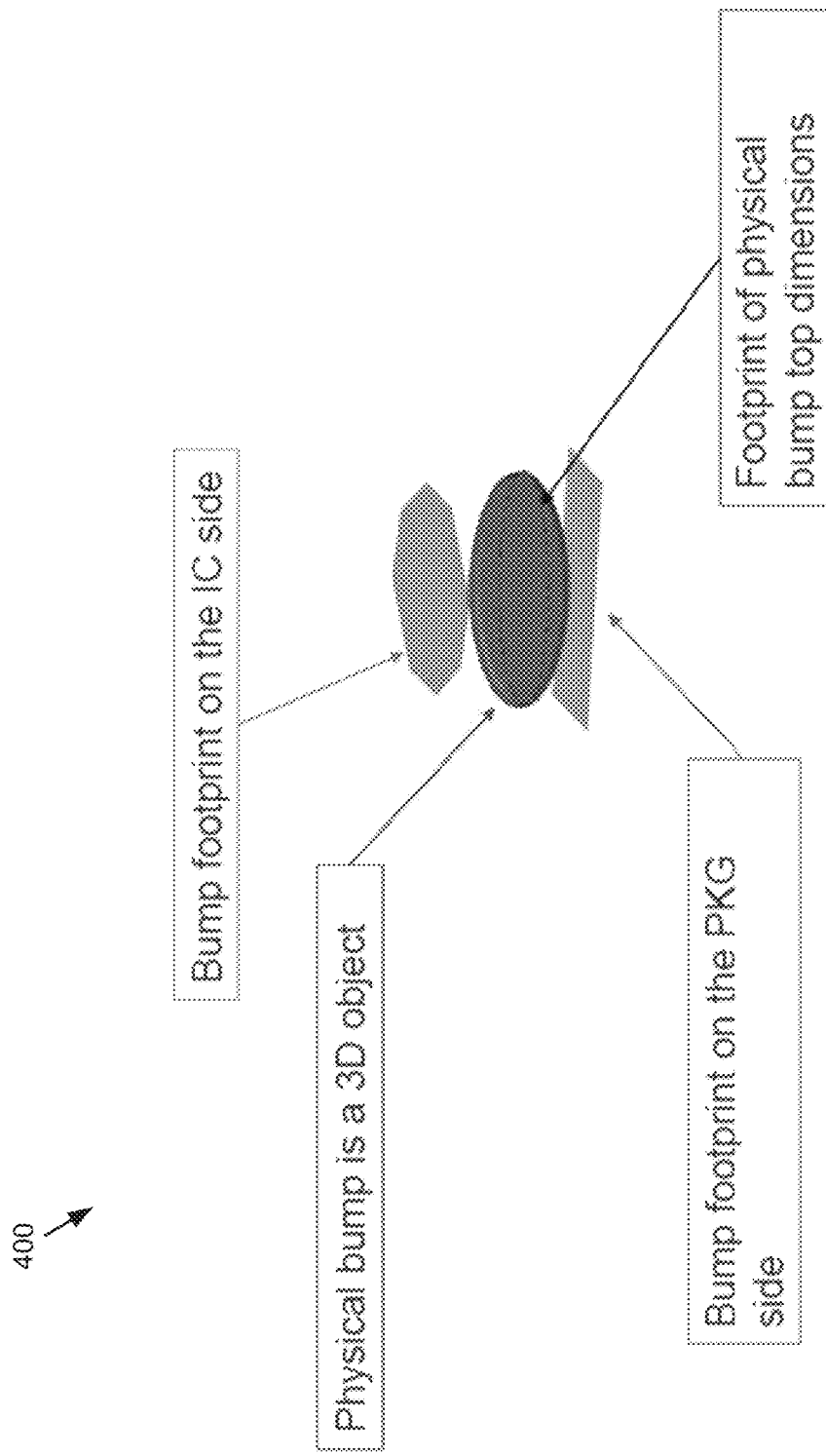
FIG. 4 is a diagram depicting bump footprints on the IC side, on the package side, and a three dimensional physical bump in accordance with an embodiment of the present disclosure.

Embodiments of layout display process 10 may be used to improve the design for manufacturing of flip-chip design packages with copper pillar, or solder bumps. Traditionally, on the layout of the die, only the bump opening may be represented, typically on the top-most metal, or passivation layer. Similarly, on the package side only a small part of the bump footprint may be represented on the layout. This is generally aligned with the die bump footprint but is not the top bump dimension. The solder bump, or copper pillar is above the geometry representing the bottom of the bump. The bumps are three-dimensional objects that are being added on top of the bump opening as shown in FIG. 4.

For better manufacturability some physical distance constraints should be adhered to. This includes not only between the bump opening, and other objects on the package surface layer but also between the top bump dimensions above the bump opening, and those other objects.

During manufacturing, when adding the solder bumps, or copper pillar bumps, the result can diverge from the original layout intent. For example, due to some manufacturing steps in which thermal stress and/or centrifugal force is applied to the components (e.g., cleaning processes). To address this challenge, the layout may be adapted before signoff to anticipate potential manufacturability issues that are otherwise hard to see in the design; this is known as design for manufacturing (DFM). These steps may be taken either preventively, or after a physical verification step has flagged design rules violations.

Figure 5:
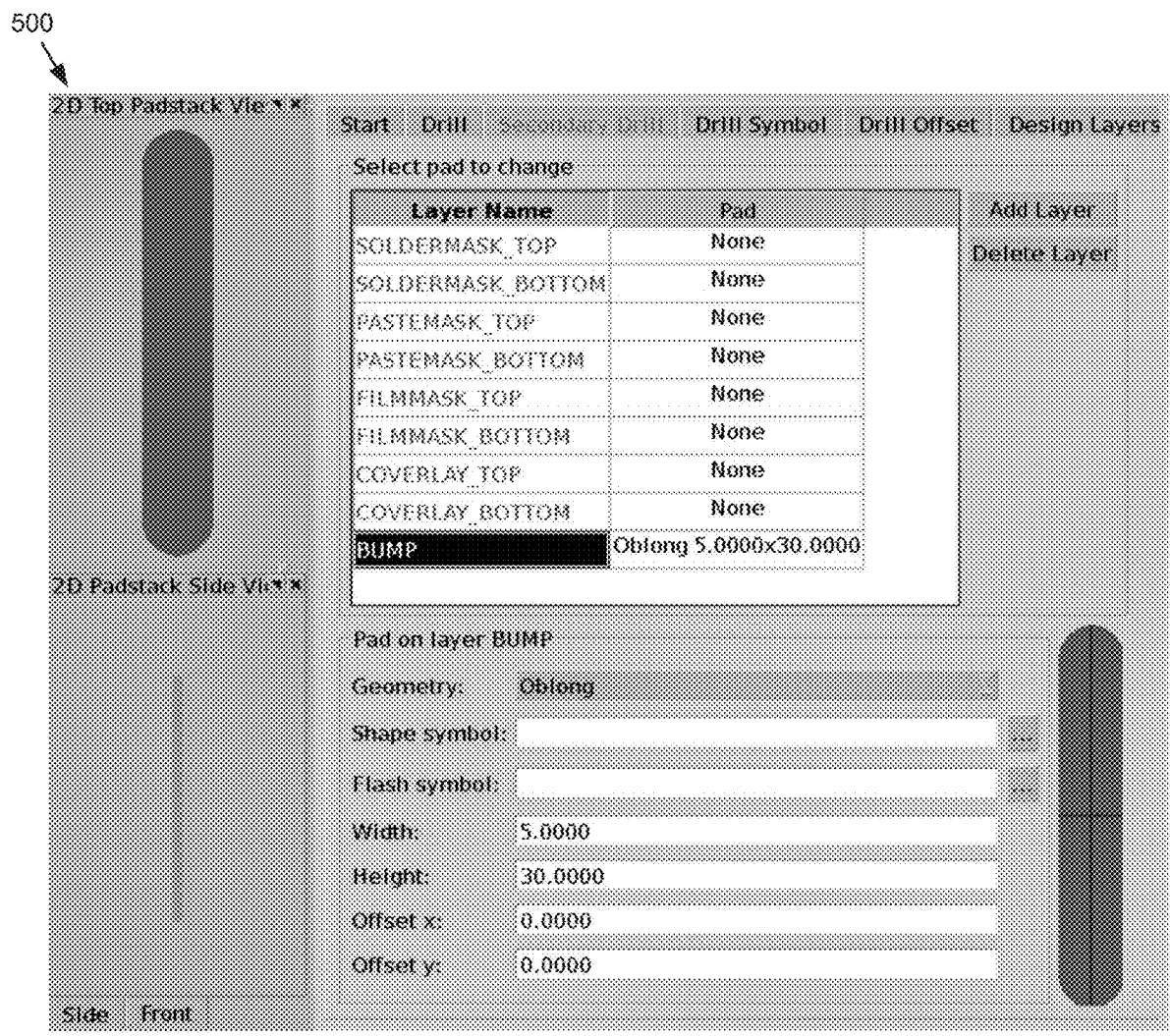
FIG. 5 is a graphical user interface in accordance with an embodiment of the present disclosure.

Referring now to FIG. 5, an example of a graphical user interface 500 is shown that may be used for top bump dimension pattern creation (e.g. using a System in Package ("SiP") layout available from the Assignee of the present disclosure). As there is no bump object in an SiP Layout database, a via overlapping with the bump opening may be added. That via may be represented with a padstack that has a user defined mask layer. That layer may also be used to draw the actual top bump dimension. The geometries on that layer can be further used for physical spacing checks with objects on other layers. Any discussion of SiP or specific applications are provided merely by way of example as the teachings of the present disclosure may be used with any suitable application.

Figure 6:
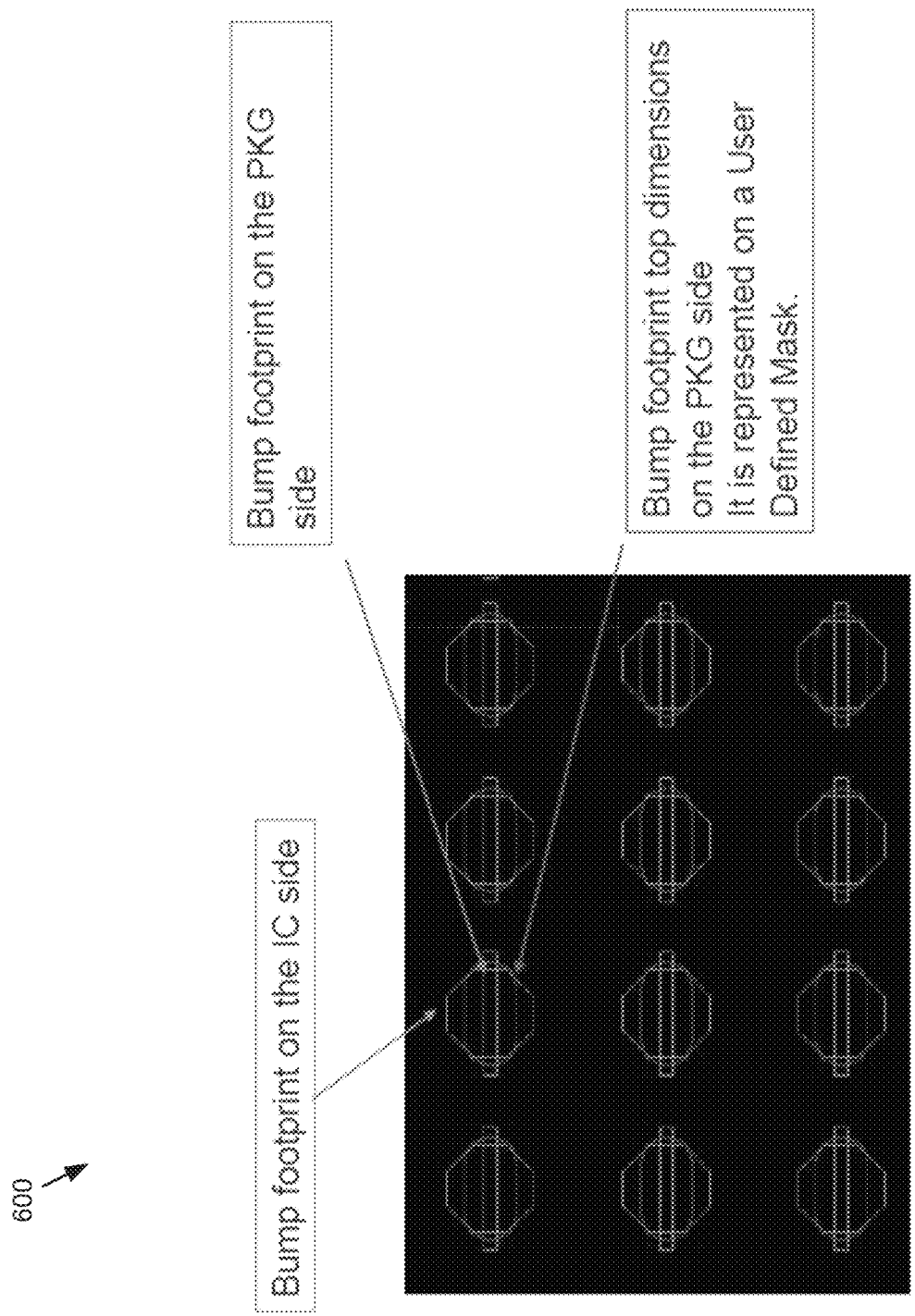
FIG. 6 is a graphical user interface in accordance with an embodiment of the present disclosure.

Referring now to FIG. 6, an embodiment showing an example package-die bump structure in SiP layout. In this particular example, the bump footprint on the IC side and the bump footprint on the package side are displayed. The bump footprint top dimensions on the package side are represented on a user defined mask.

Figure 7:
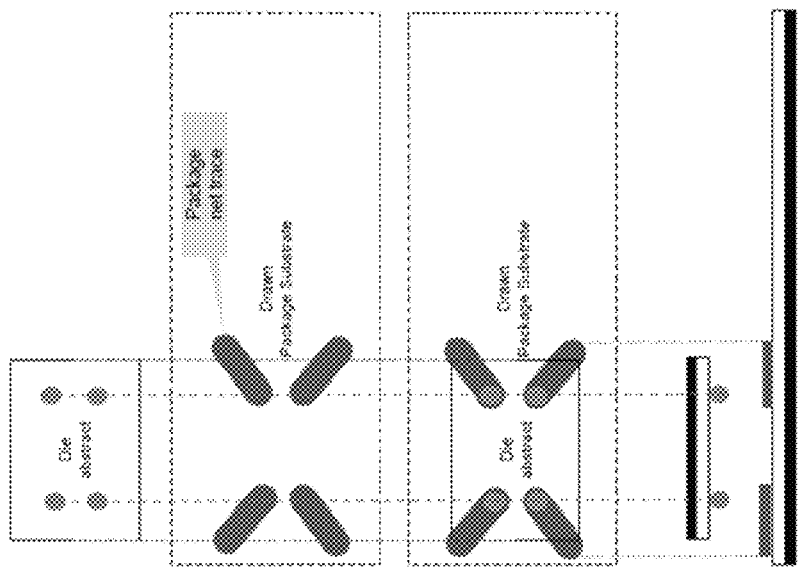
FIG. 7 is a graphical user interface in accordance with an embodiment of the present disclosure.
Figure 7:
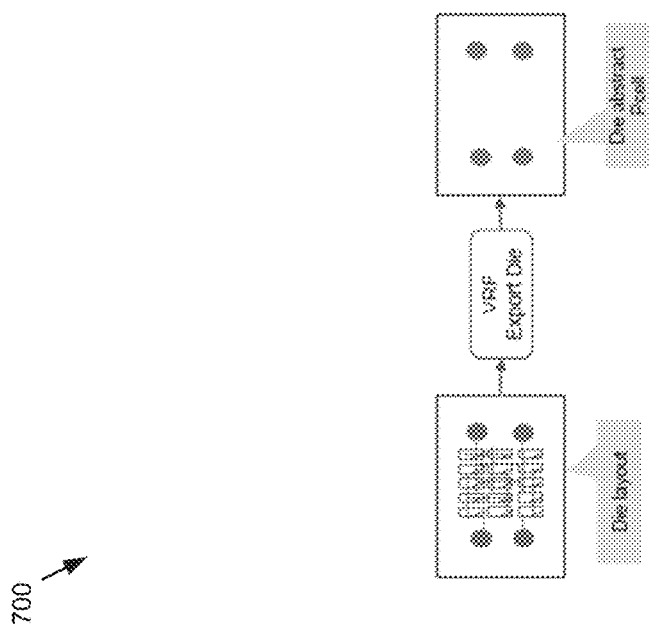

Referring now to FIG. 7, an embodiment showing an example EDA application 20 for package design flow is provided. In this example, the die layout may be exported as die abstract and then instantiated on a package substrate. In some cases, package traces end points may coincide with die bump center.

Figure 8:
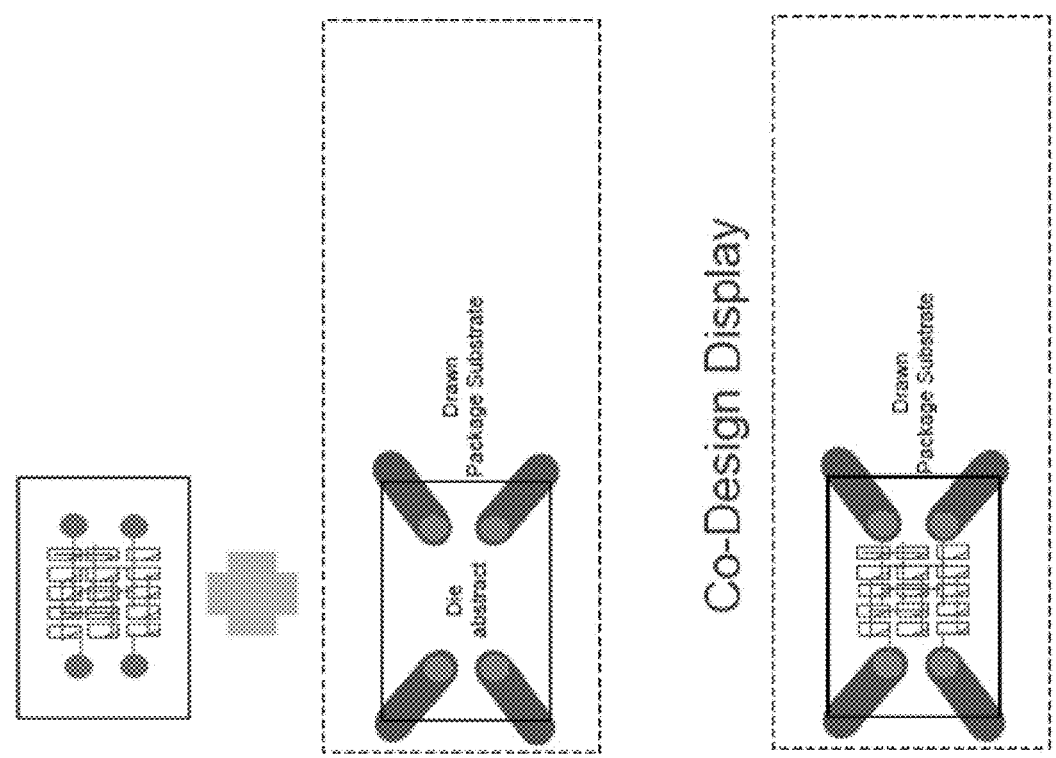
FIG. 8 is a graphical user interface in accordance with an embodiment of the present disclosure.

Referring now to FIG. 8, an embodiment showing an example including layout versus abstract (LVA) features. EDA application 20 may offer different features to ensure that the die abstract is synchronized with die layout. Some of these may include Layout Versus Abstract (LVA) (e.g., report bump alignment mis-matches), LVA Fixer (e.g., fix bump alignment miss-matches), Co-Design, etc. A Co-Design die may refer to an EDA view of the die which permits viewing/editing in different domain fabrics. e.g. typically here between the package, and IC domain fabrics. A die abstract (aka as abstract) can be generated to store the needed information to describe that co-design die object, and can be transferred between the two domain fabrics. Co-Design may be used to synchronize die views (e.g., die layout bump move auto moves die abstract bump, die abstract bump move auto moves die layout bump, etc.) and also to display a real die layout "under" die abstract. Layout versus abstract is a logical and physical check that may be configured to compare the connectivity, and position of bumps of the drawn layout versus the connectivity that is stored in the die abstract.

Figure 9:
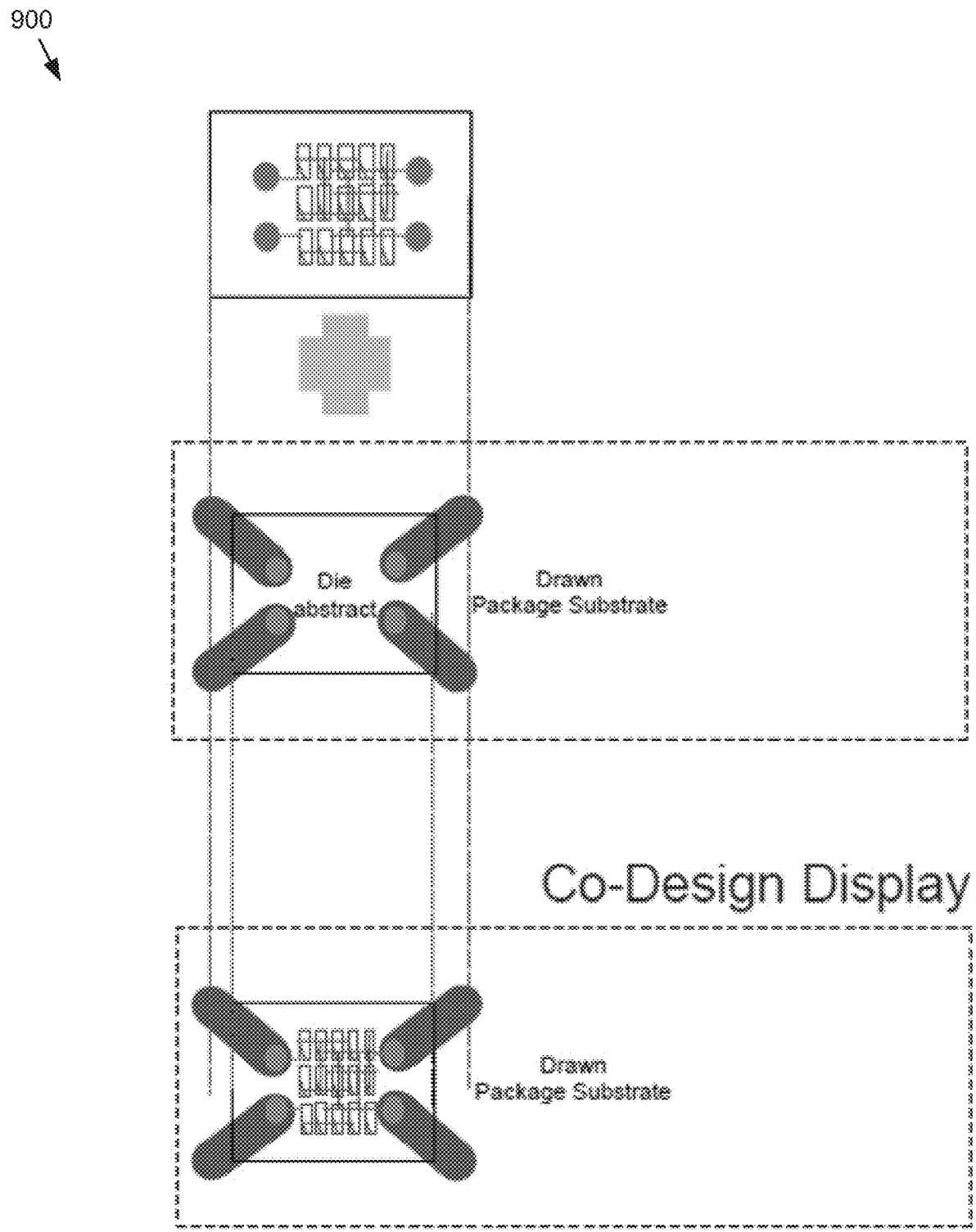
FIG. 9 is a graphical user interface in accordance with an embodiment of the present disclosure.

Referring now to FIG. 9, an embodiment showing an example of optical shrink is provided. In this example, an exported die abstract parametrized cell (PCell) may include one opticalShrink parameter enabling the user to reduce the size of the die abstract. When in Co-Design mode, the die layout display may be reduced accordingly. A PCell is a way to describe a component with some attached parameterized values. Those values can easily be changed. In some embodiments, the shrink/spread parameter applied to the Co-Design die may be changed through a parameter.

Accordingly, embodiments of layout display process 10 may provide for a better representation of bump placement in an actual manufactured component. In existing systems, some components may be rejected after manufacturing due to unanticipated short circuits or they may be rejected after manufacturing due to poor electrical connection. This may have an impact on both yield and reliability.

Figure 10:
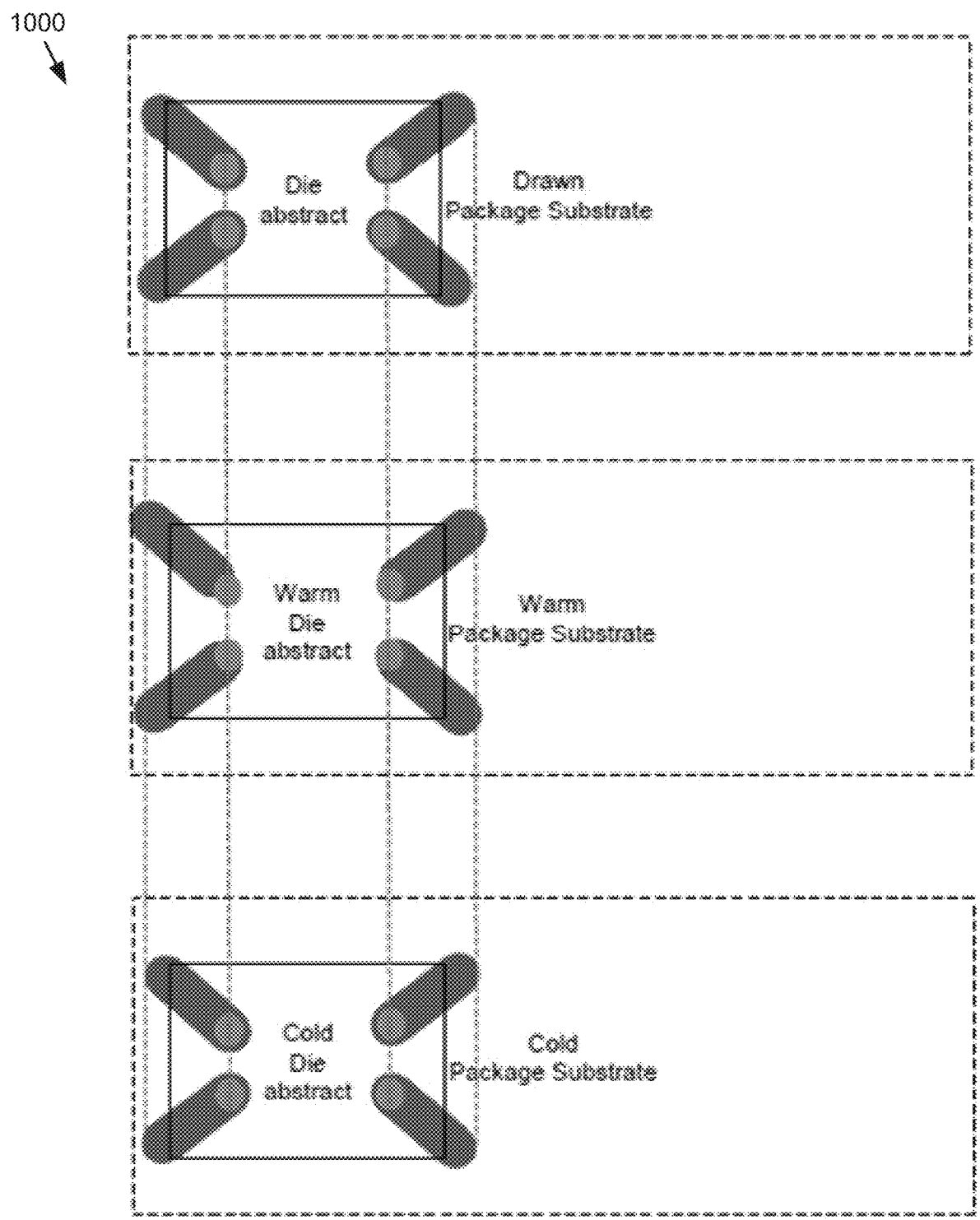
FIG. 10 is a graphical user interface in accordance with an embodiment of the present disclosure.
Figure 11:
FIG. 11 is a graphical user interface in accordance with an embodiment of the present disclosure.
Figure 11:
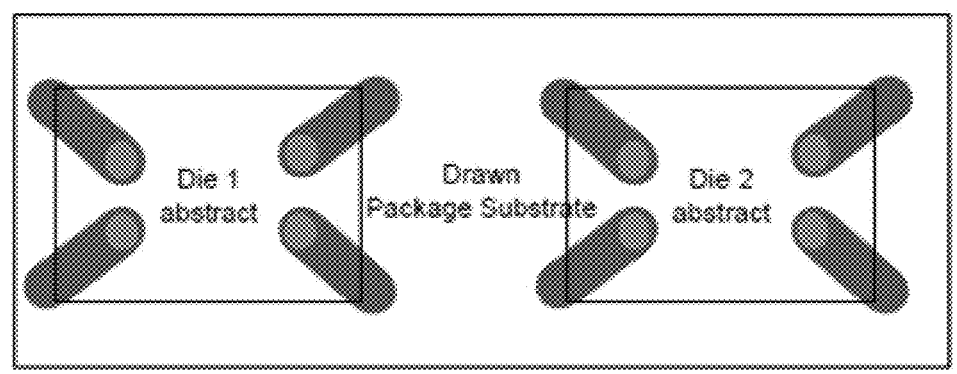
Figure 11:
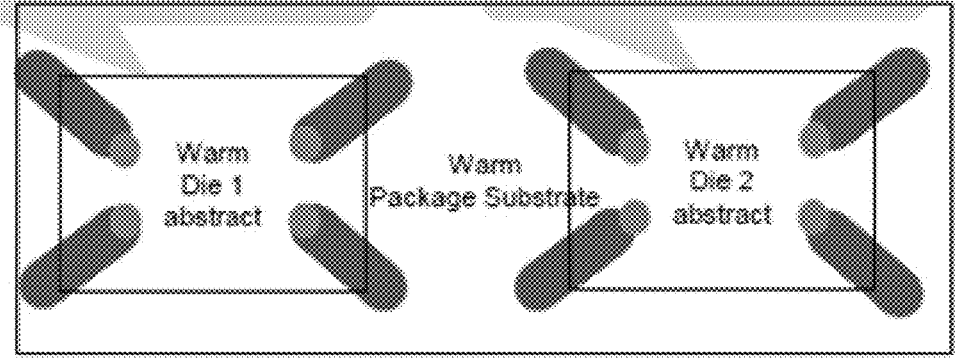
Figure 11:
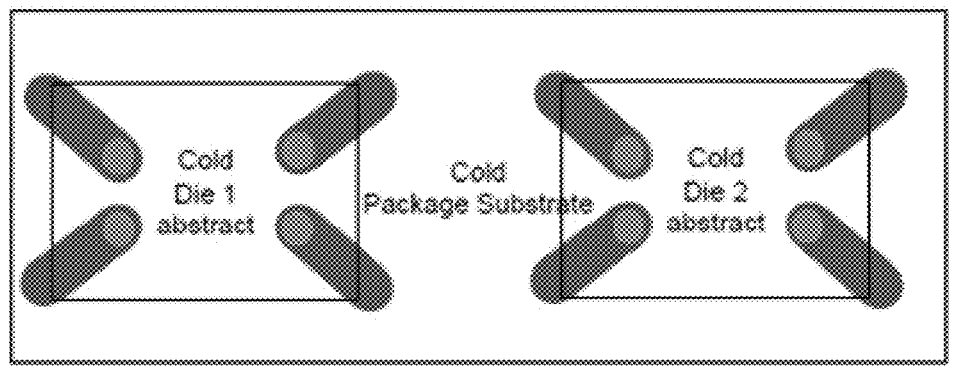
Figure 12:
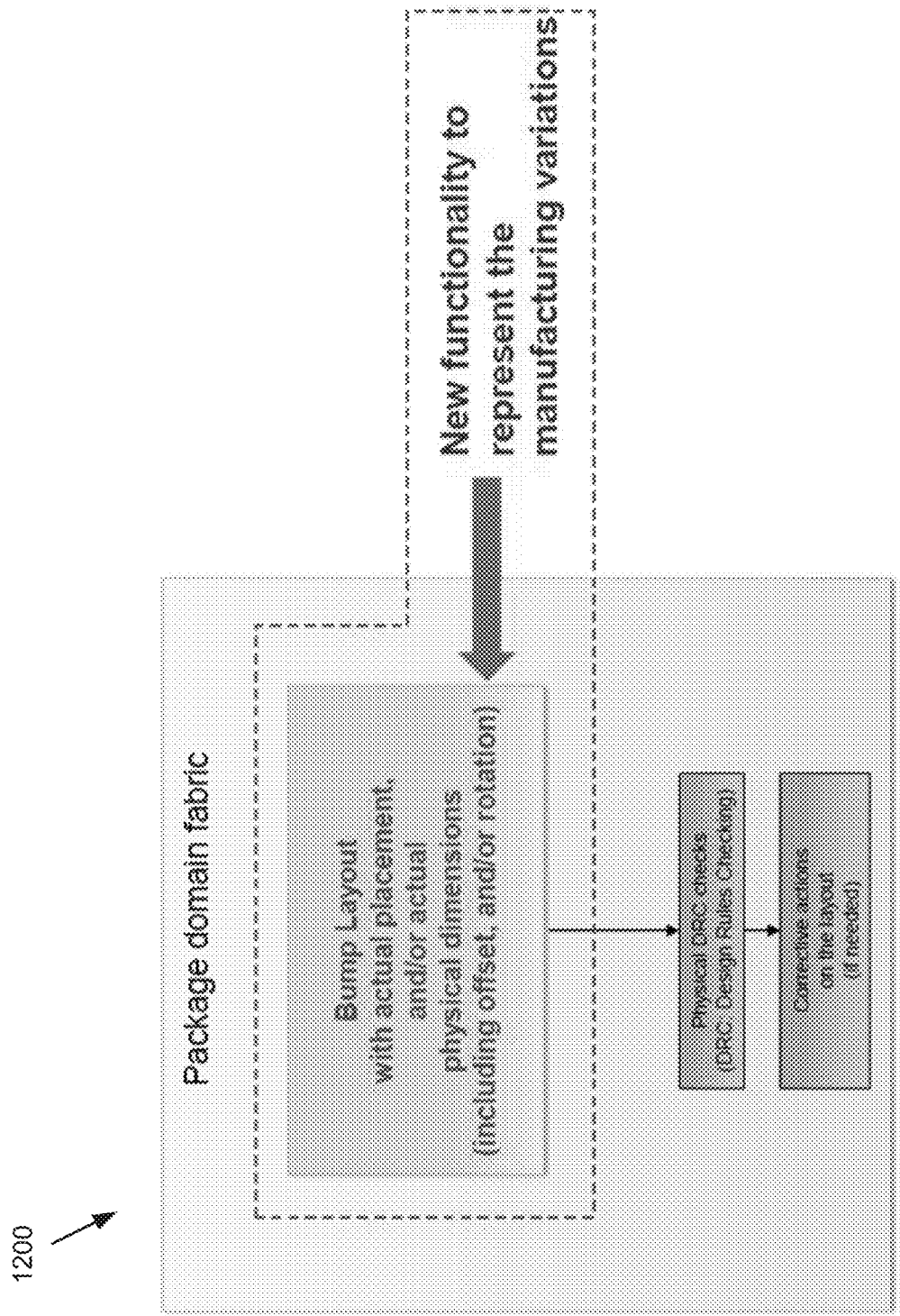
FIG. 12 is a diagram depicting an embodiment of a system in accordance with the present disclosure.
Figure 13:
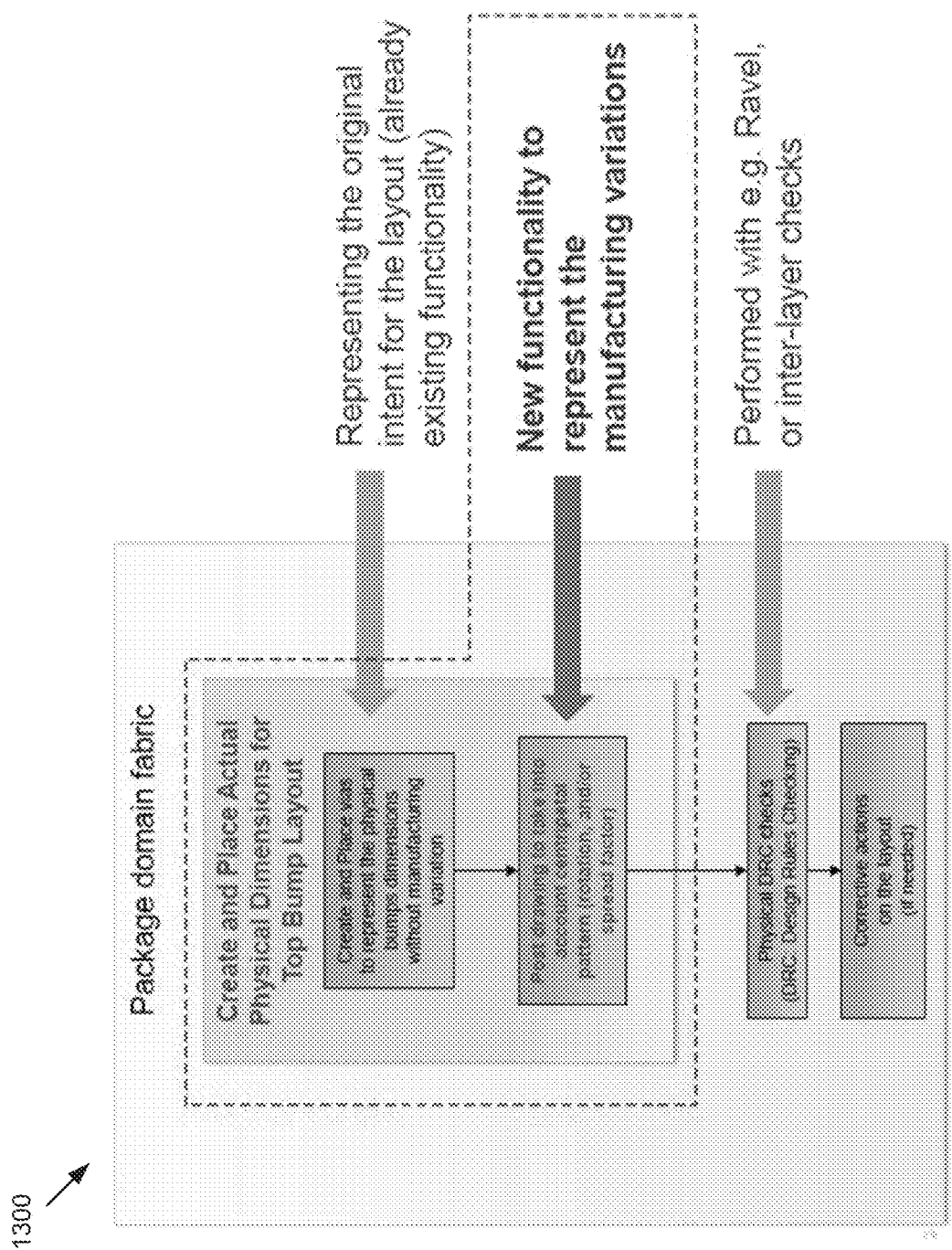
FIG. 13 is a diagram depicting an embodiment of a system in accordance with the present disclosure.

Referring now to FIG. 10, an embodiment showing an example flow for a die to package assembly. Die to package may be assembled by heating up both the die and the package. Here, the bump flux may melt down to achieve soldering. The problem is that package Coefficient of Thermal Expansion (CTE) may not be the same as die CTE. Once heated up, package traces spread and their end point don't coincide anymore with die bump center. This results in a poor electrical connection. It should be noted that post manufacture, once the system cools down, package traces return to their original location, however, the damage has already occurred. As is show in FIG. 11, different dies might be assembled to the package substrate at different temperatures. This may lead to different local expansion.

In an effort to address the variations due to the manufacturing processes, the layout may be adapted before signoff to anticipate potential manufacturability issues that are otherwise hard to see in the design; this is known as design for manufacturing (DFM). This may be used either preventively or after a physical verification step has flagged design rules violations.

Accordingly, and referring now to FIGS. 12-29, embodiments of layout display process 10 are provided. Layout display process 10 may include a new approach for drawing bump layouts for thermal and centrifugal force manufacturing variations as is show in FIGS. 1-13.

Figure 14:
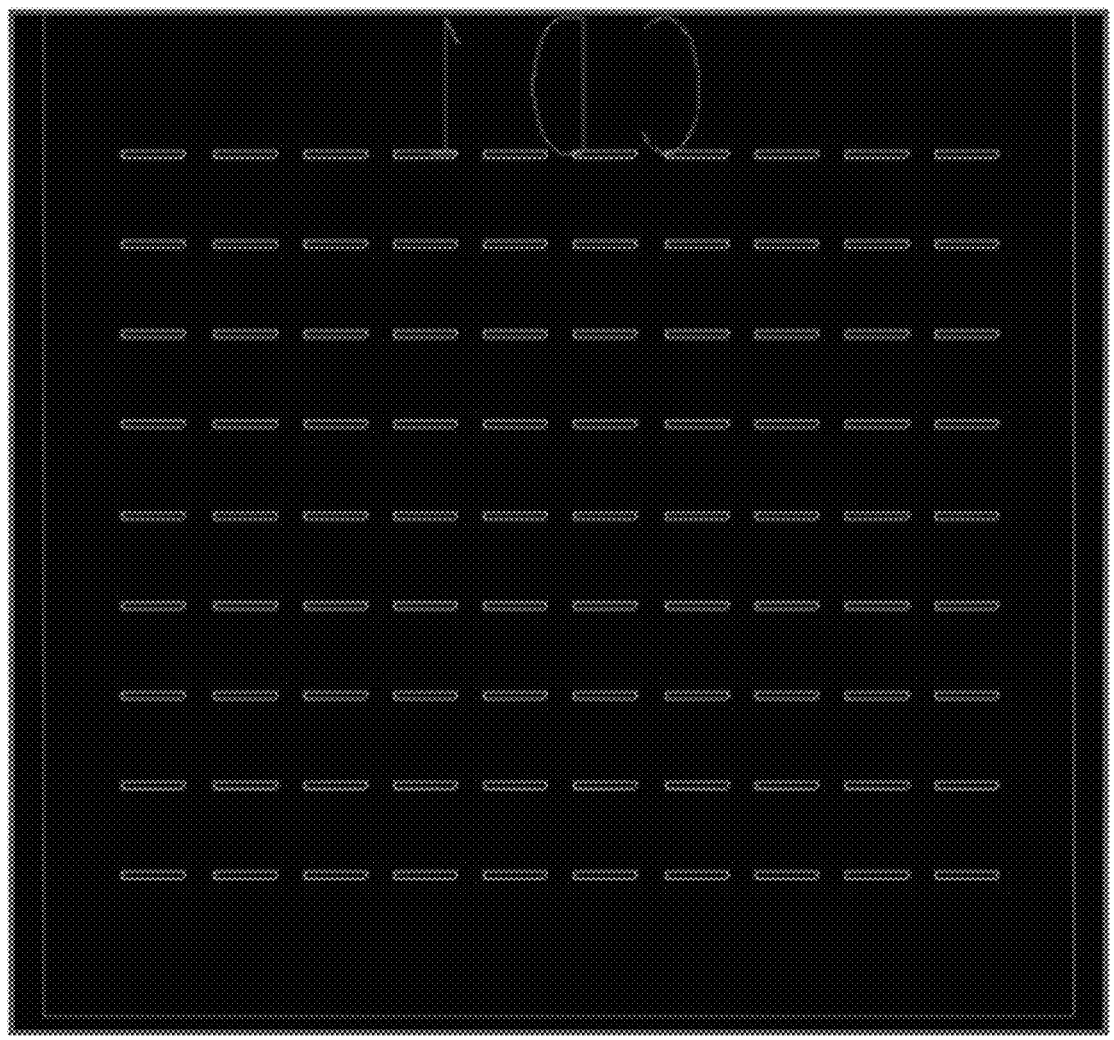
FIG. 14 is a graphical user interface in accordance with an embodiment of the present disclosure.
Figure 15:
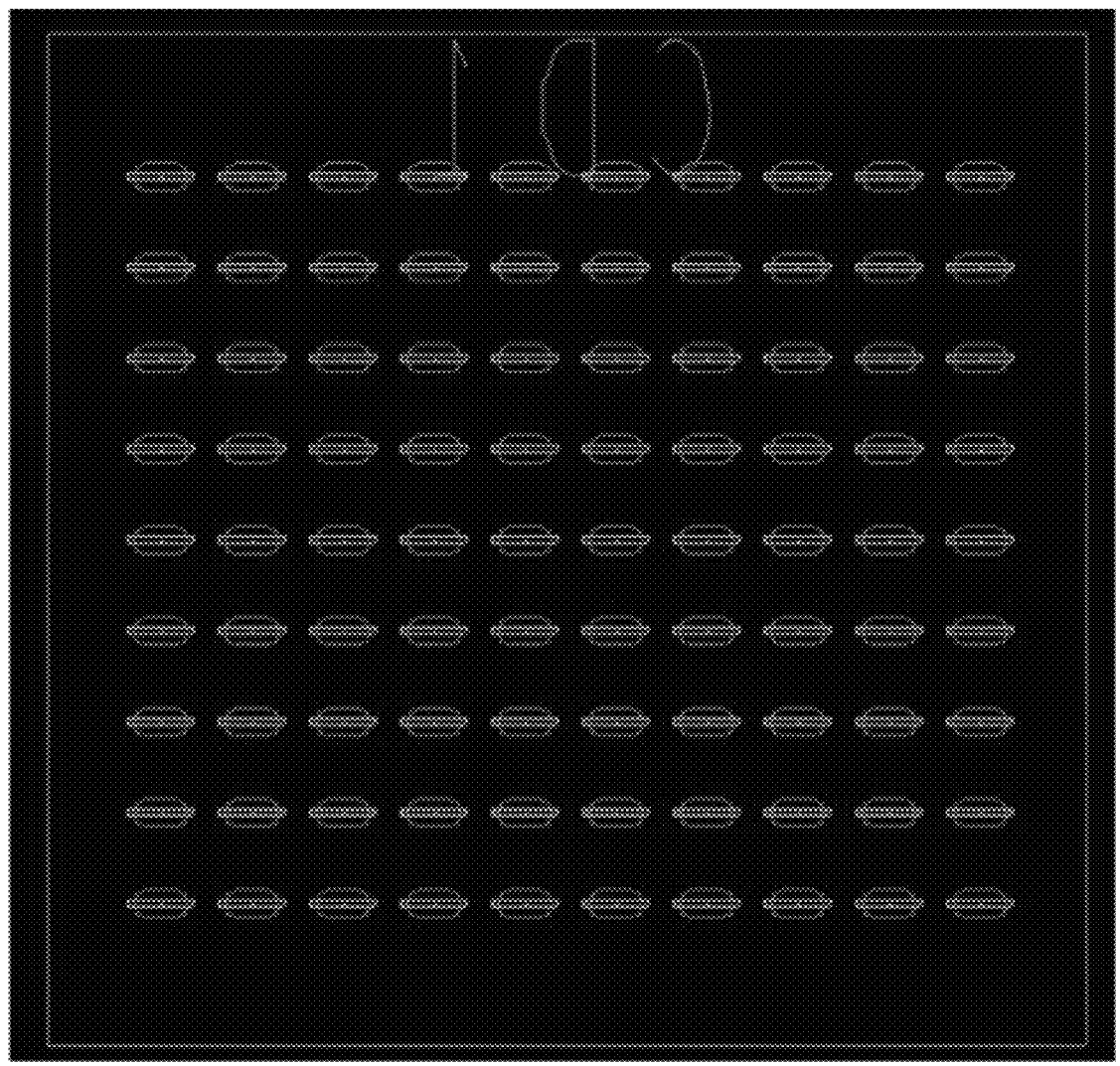
FIG. 15 is a graphical user interface in accordance with an embodiment of the present disclosure.
Figure 16:
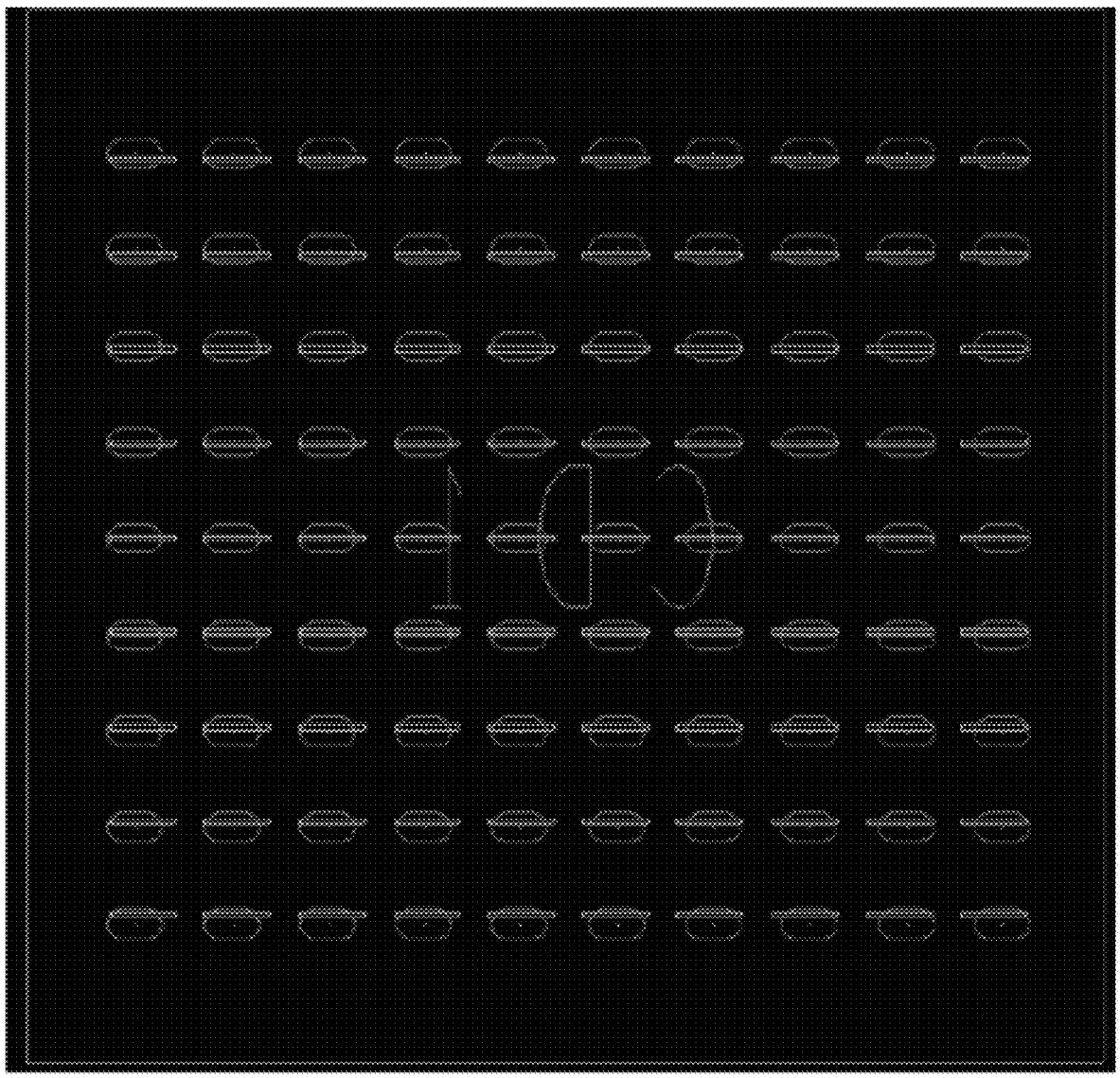
FIG. 16 is a graphical user interface in accordance with an embodiment of the present disclosure.
Figure 17:
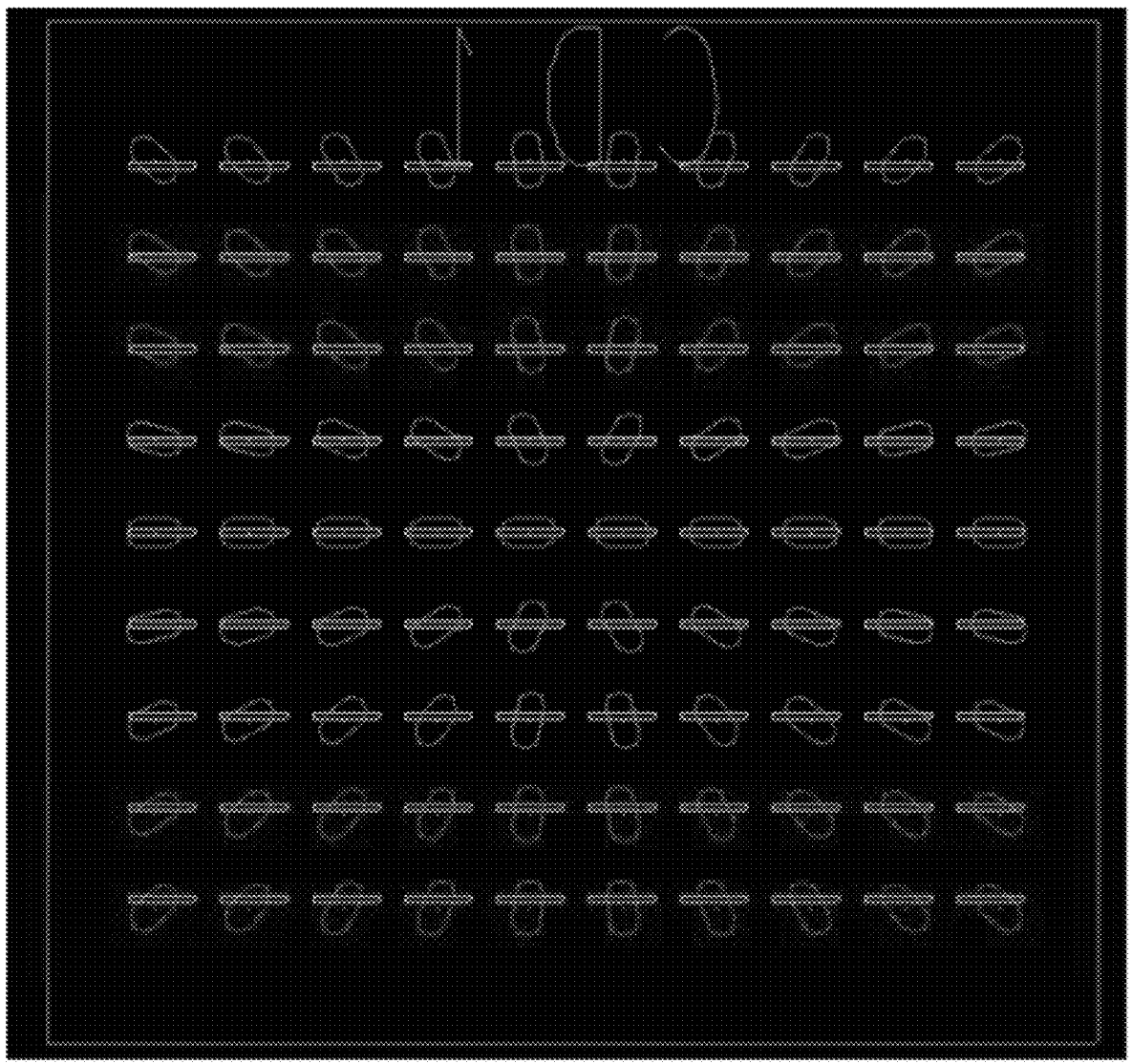
FIG. 17 is a graphical user interface in accordance with an embodiment of the present disclosure.
Figure 18:
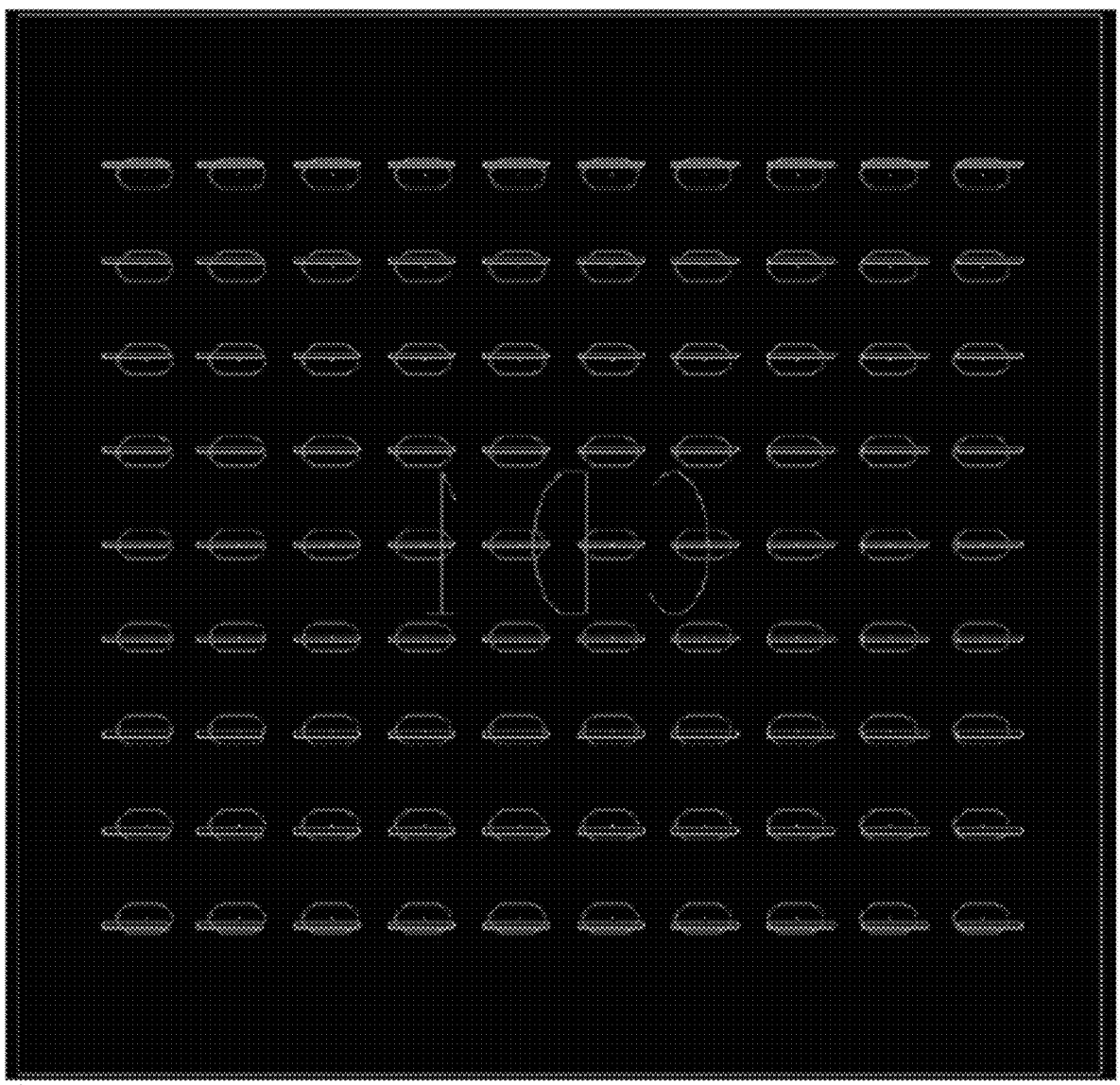
FIG. 18 is a graphical user interface in accordance with an embodiment of the present disclosure.
Figure 19:
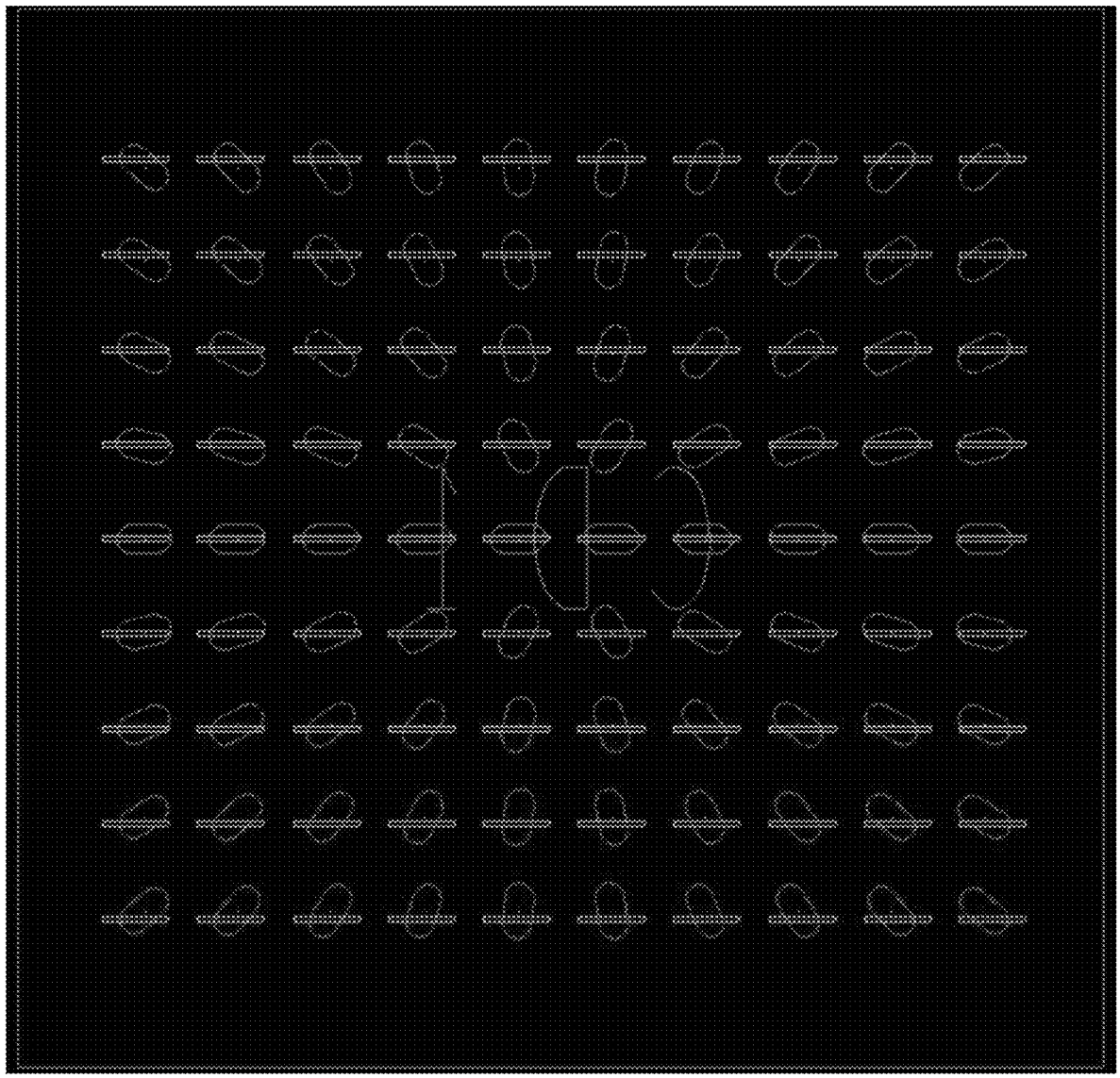
FIG. 19 is a graphical user interface in accordance with an embodiment of the present disclosure.

Referring now to FIG. 14, an embodiment showing a view of the die in the package domain fabric with an initial bumps footprint is provided. In contrast, FIG. 15 shows an embodiment showing a view of the die in the package domain fabric with intended top bump dimensions. FIG. 16 shows an embodiment showing a view of the die in the package domain fabric with the top bump dimensions and actual placement. This example shows a spread and no rotation. FIG. 17 shows an embodiment showing a view of the die in the package domain fabric with top bump dimensions and actual placement. This example shows spread and rotation. FIG. 18 shows an embodiment showing a view of the die in the package domain fabric with top bump dimensions and actual placement. This example shows shrink and no rotation. FIG. 19 shows an embodiment showing a view of the die in the package domain fabric with top bump dimensions and actual placement. This example shows shrink and rotation.

Figure 20:
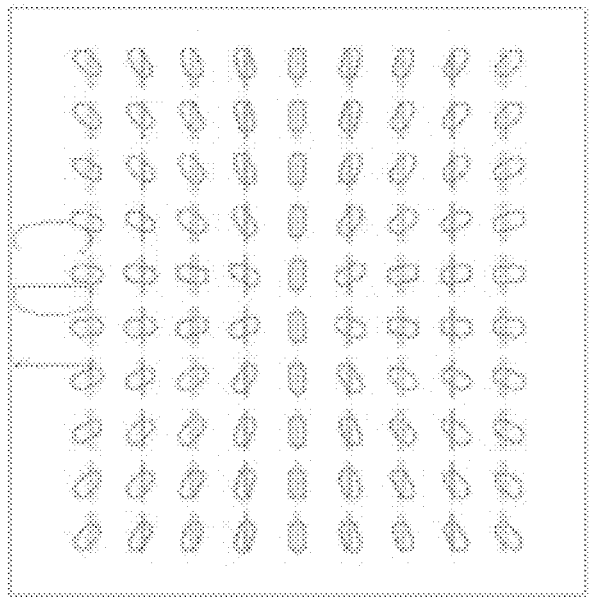
FIG. 20 is a graphical user interface in accordance with an embodiment of the present disclosure.
Figure 20:
Figure 20:
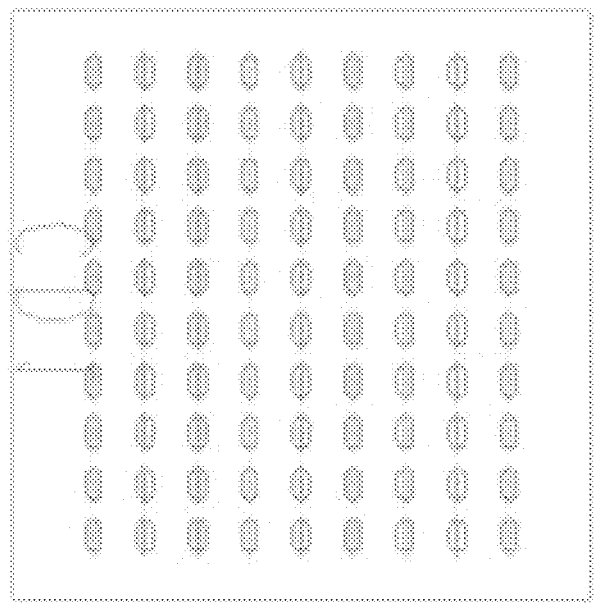
Figure 21:
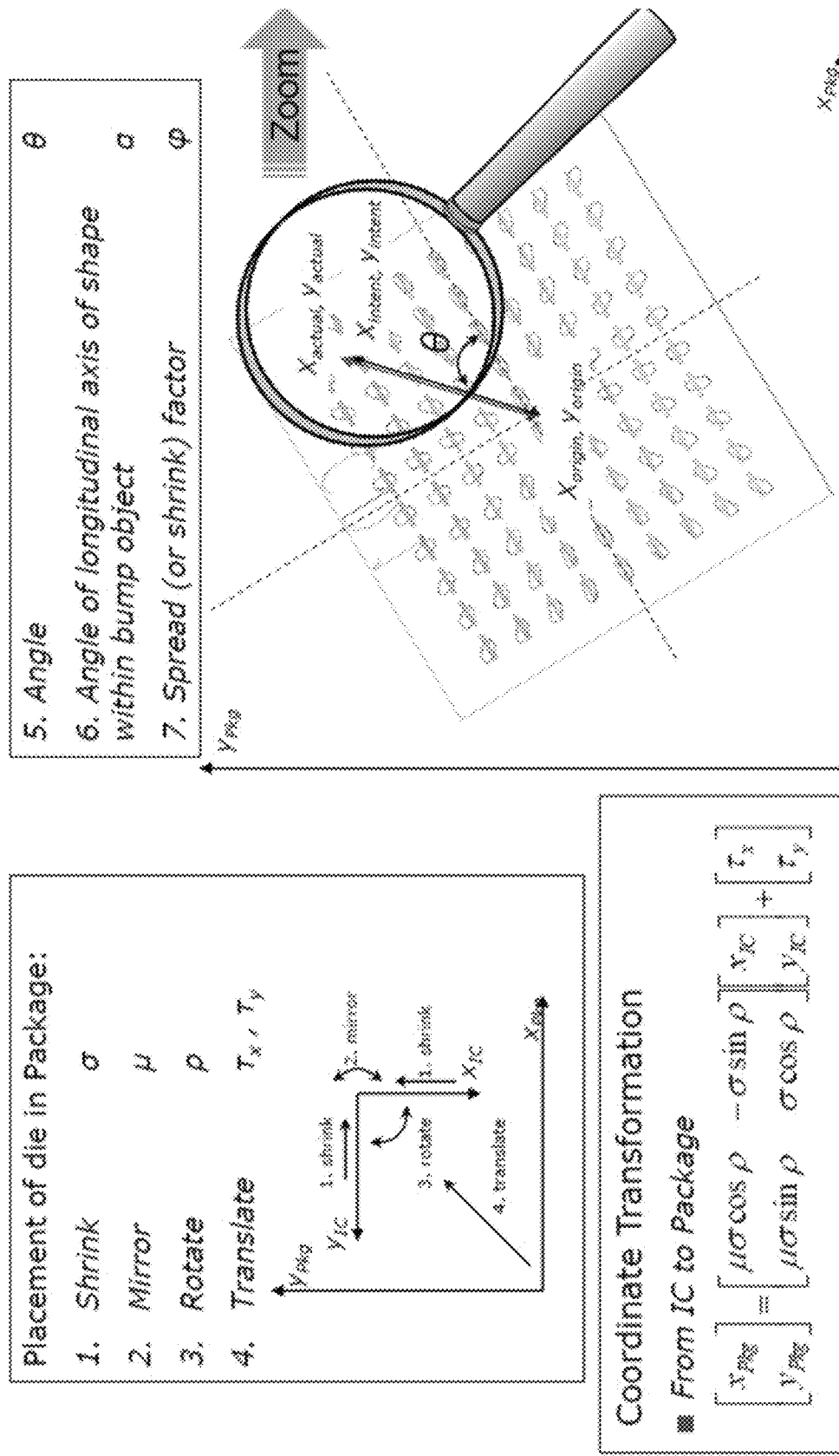
FIG. 21 is an example of calculations and a corresponding graphical user interface in accordance with an embodiment of the present disclosure.
Figure 22:
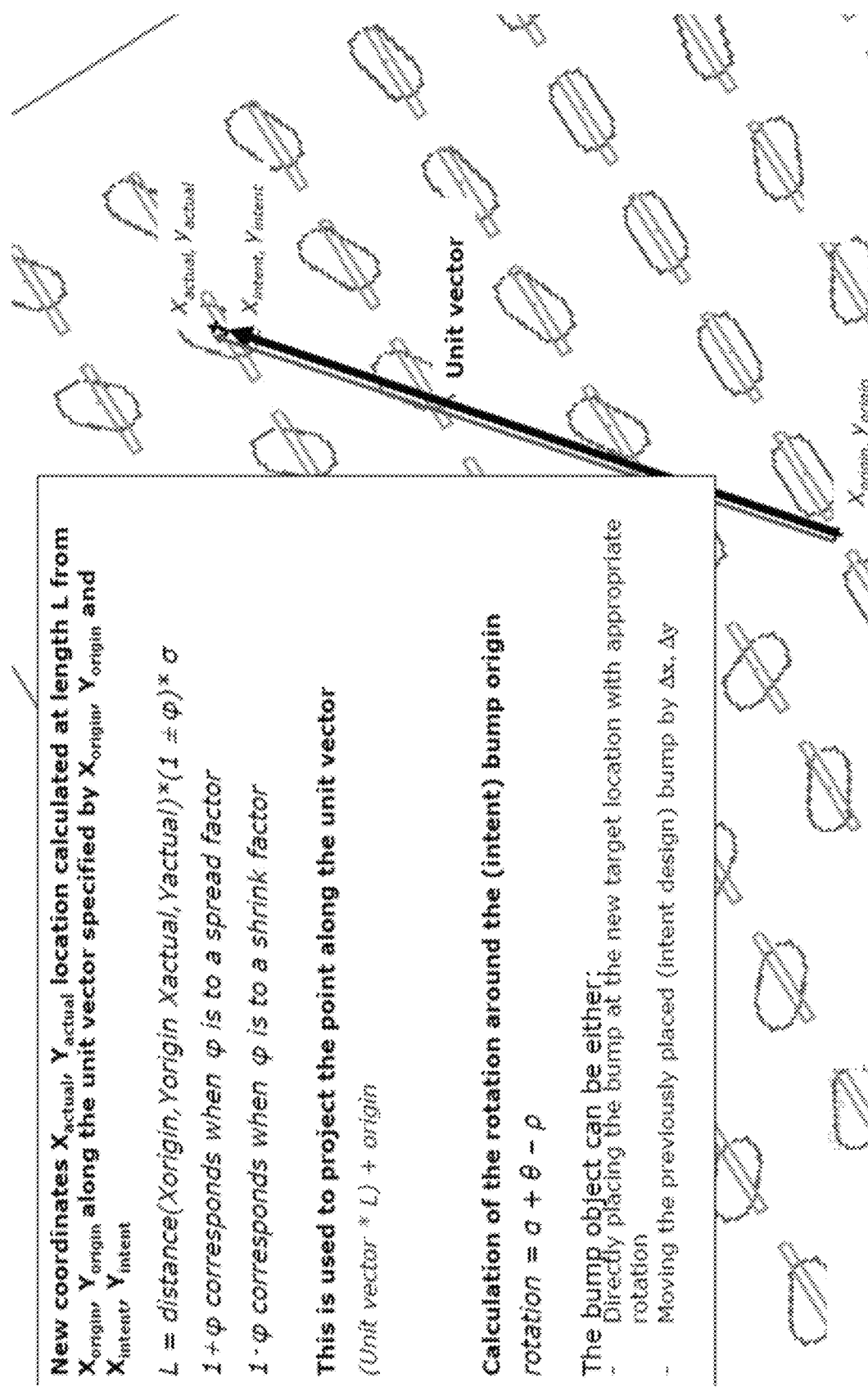
FIG. 22 is an example of calculations and a corresponding graphical user interface in accordance with an embodiment of the present disclosure.

Referring now to FIGS. 20-22, embodiments of layout display process 10 showing the transformation between design intent and manufacturing variation are provided. As is shown in FIG. 21, placement of die in package may be based upon, at least in part, shrink, mirror, rotation, translation, angle, angle of longitudinal axis of shape within bump object, spread or shrink factor, etc. In this particular example, shrink may refer to the optical shrink that may be applied to the Co-Design die when placing it in the package domain fabric. Mirroring is the ability to flip the Co-Design in place when placed in the package domain fabric. Rotation may refer to the ability to change the orientation of the co-design die with respect to the package domain fabric reference axis. Translation may refer to the ability to place the Co-Design die at a reference point that is different from the origin of the axis of the package domain fabric. In mathematics, the polar coordinate system is a two-dimensional coordinate system in which each point on a plane is determined by a distance from a reference point and an angle from a reference direction. Here the reference point is the center of the Co-Design die. The angle is corresponding measure of the polar coordinates of a given bump object. The angle of longitudinal axis within the bump object may refer to an arrangement where the bump object has a width different from its height, the longest dimension may be oriented typically with a 0, or 90 degrees within the bump (although may have other orientations as well). This may be important as it is the longest dimension of the bump that needs to be oriented towards the reference point center. The spread or shrink factor may determine if the bump objects need to be moved away (e.g., typically towards the outside of the co-design die), or to be moved into (e.g., typically towards the center of the co-design die). It is to be noted that the point origin for that spread/shrink factor may be any other reference point than the center of the co-design die though (e.g. center of the package instead) as discussed below.

An example of the coordinate transformation from the IC to the package is shown in FIG. 21. FIG. 22 shows one possible example of how layout display process 10 may be used to transform between design intent and manufacturing variation. The example shown in FIG. 22 shows the calculation of new coordinates as well as the calculation of the rotation around the (intent) bump origin. The bump object may be placed in any suitable location. For example, directly placed at the new target location with the appropriate location, moving the previously placed (intent design) bump by the ΔX, ΔY calculations, etc.

Figure 23:
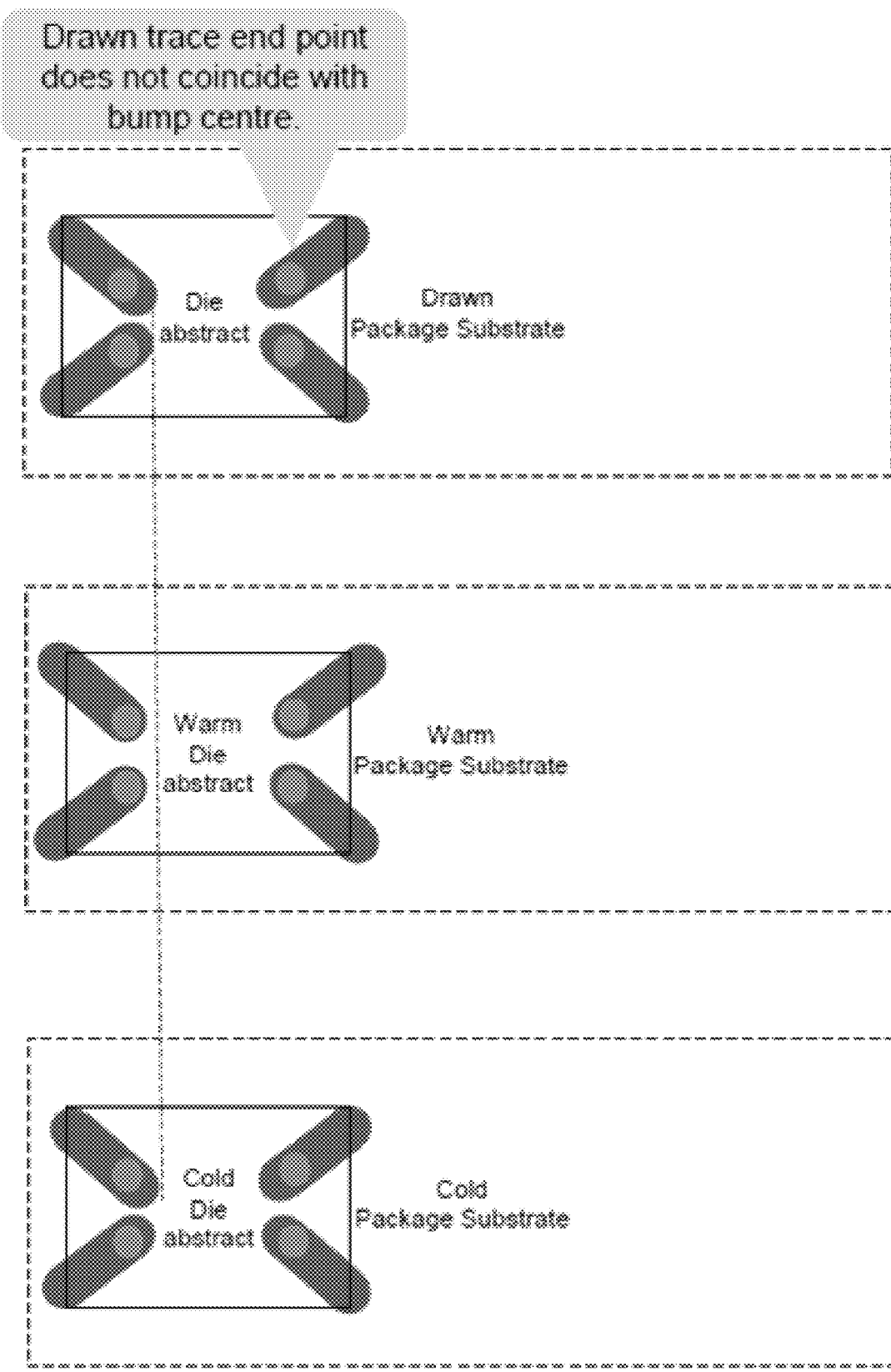
FIG. 23 is a diagram depicting an embodiment of a system in accordance with the present disclosure.

Referring now to FIG. 23, an embodiment consistent with layout display process 10 showing compensation for a CTE difference is provided. In this example, the approach includes concentrating the package trace end point closer to the die center, in such a way that once heated up for assembly, their center may coincide with die bumps. It should be noted that post assembly, once cooled down to room temperature, package traces center may go back to their original location. In this example, the electrical connection was properly done. FIG. 23 also shows how to allow a user via a trace editor to offset a trace end point from die abstract bump. Embodiments of layout display process 10 may allow the user to view that traces are correctly created (e.g., end point centered with die bumps).

Figure 24:
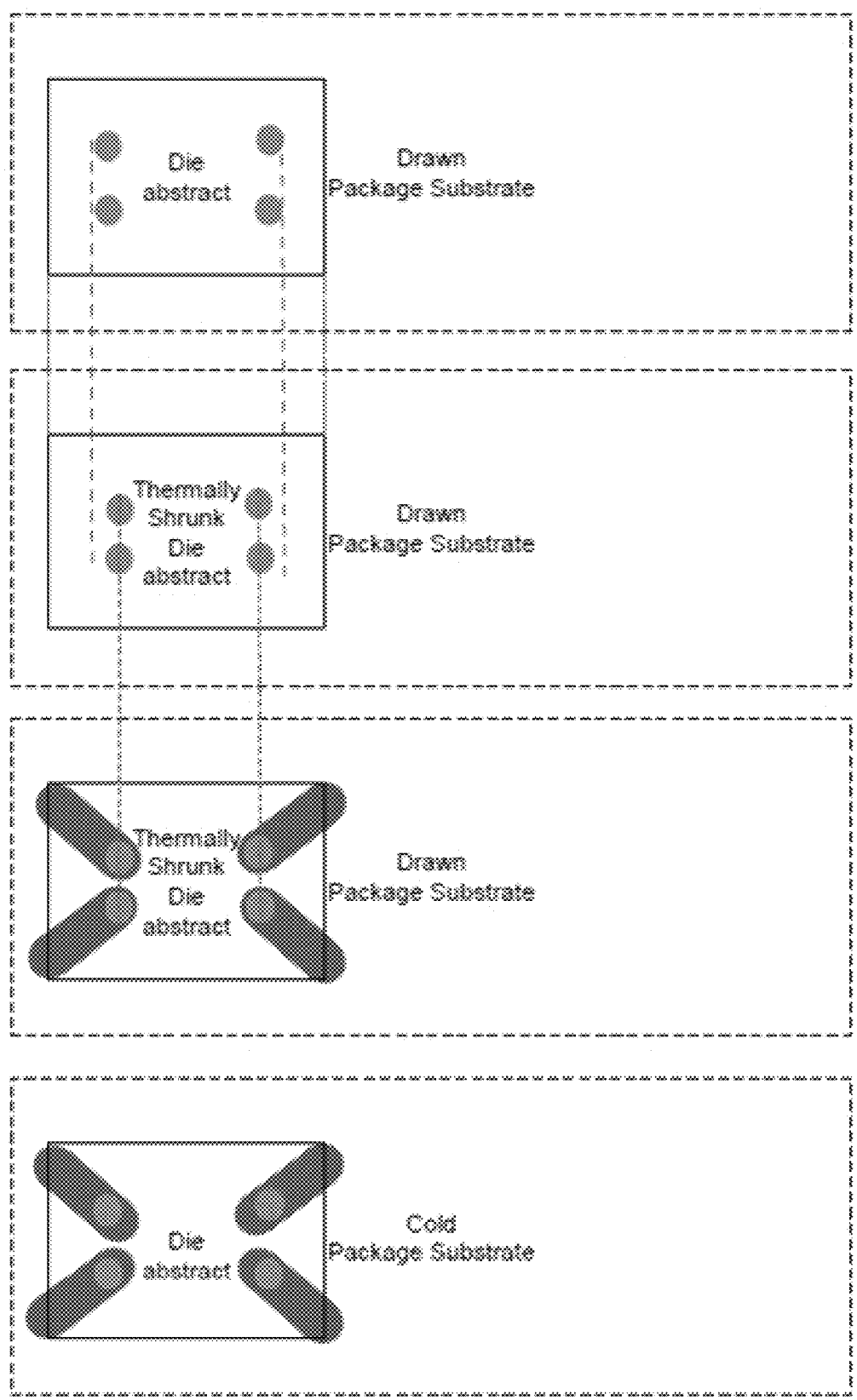
FIG. 24 is a diagram depicting an embodiment of a system in accordance with the present disclosure.

Referring now to FIG. 24, an embodiment consistent with layout display process 10 showing the addition of a thermalShrinkPercentage real parameter to the die abstract PCell. This parameter does not affect the die abstract boundary and may not be combined with optical shrink factor. It may be applied after the optical shrink factor. In this example, the first parameter opticalShrink and the thermalShrinkPercentage are shown in FIG. 21.

In some embodiments, die abstract bumps may be attracted closer to die abstract center as a function of that parameter. Additionally and/or alternatively, the package layout traces end point may coincide to thermally shrunk die bump center. If a user resets the thermalShrinkPercentage parameter, then the die bump may return to their original location, however, the net traces may be correctly created.

Figure 25:
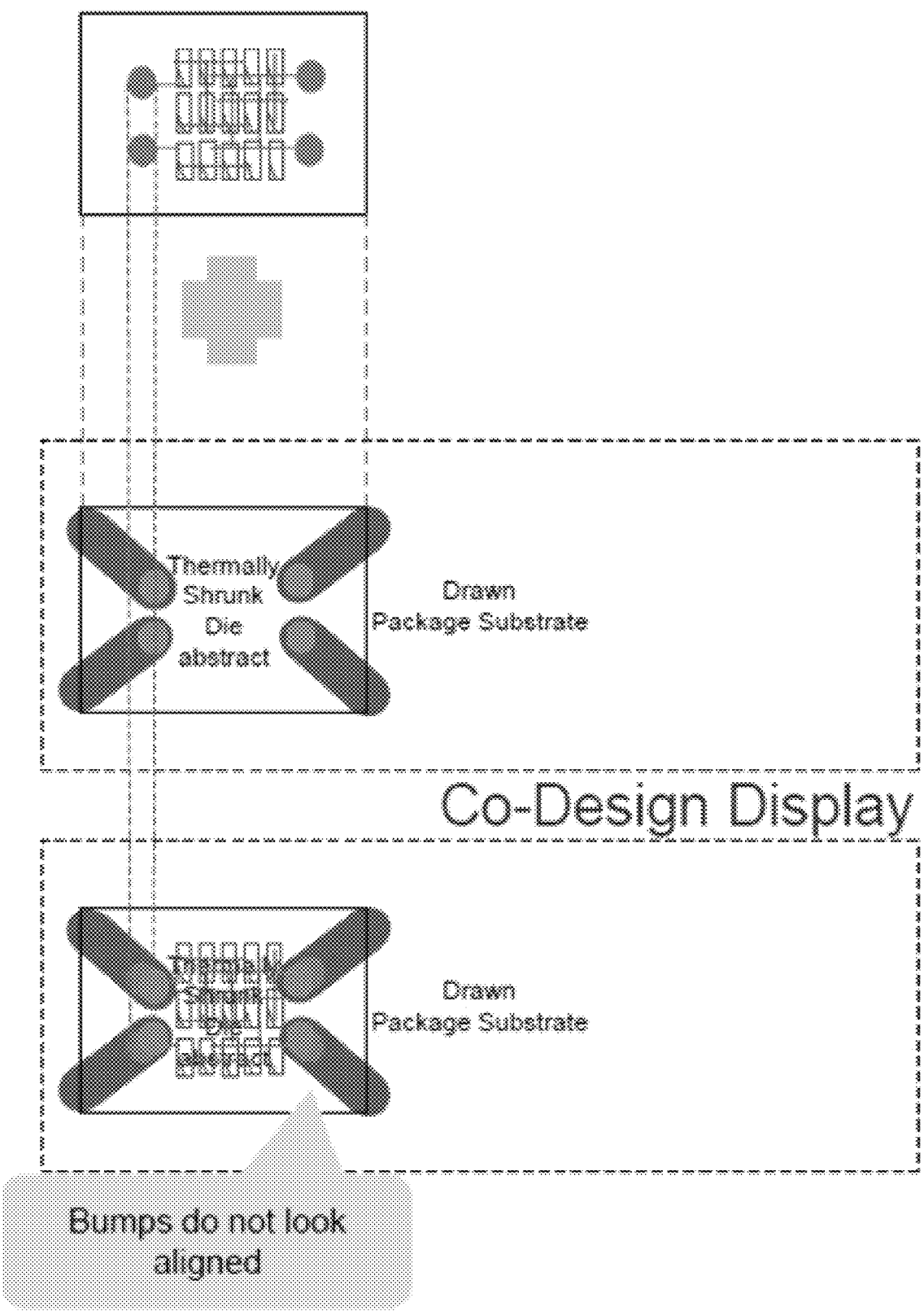
FIG. 25 is a diagram depicting an embodiment of a system in accordance with the present disclosure.

Referring now to FIG. 25, an embodiment consistent with layout display process 10 showing various design impacts is provided. For the LVA, LVA Fixer, and Co-Design synch embodiments of layout display process 10 may be configured to reverse-adjust the die abstract bump location according to the die abstract thermalShrink parameter before comparing to die layout bump location. For the Co-Design display, die layout bumps may not appear aligned to die abstract bumps as soon as die abstract thermalShrinkPercentage is different from 0.

Figure 26:
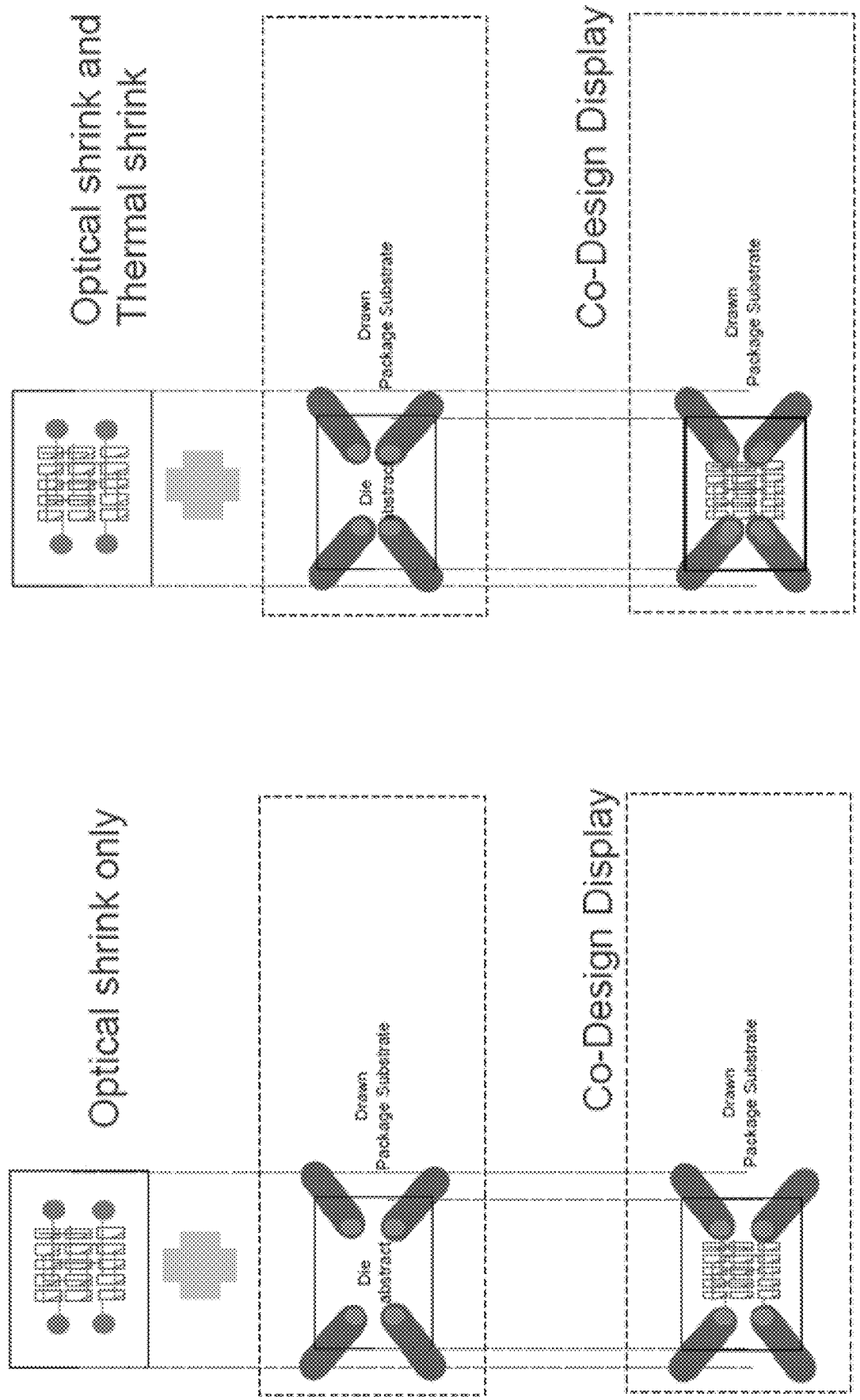
FIG. 26 is a diagram depicting an embodiment of a system in accordance with the present disclosure.
Figure 27:
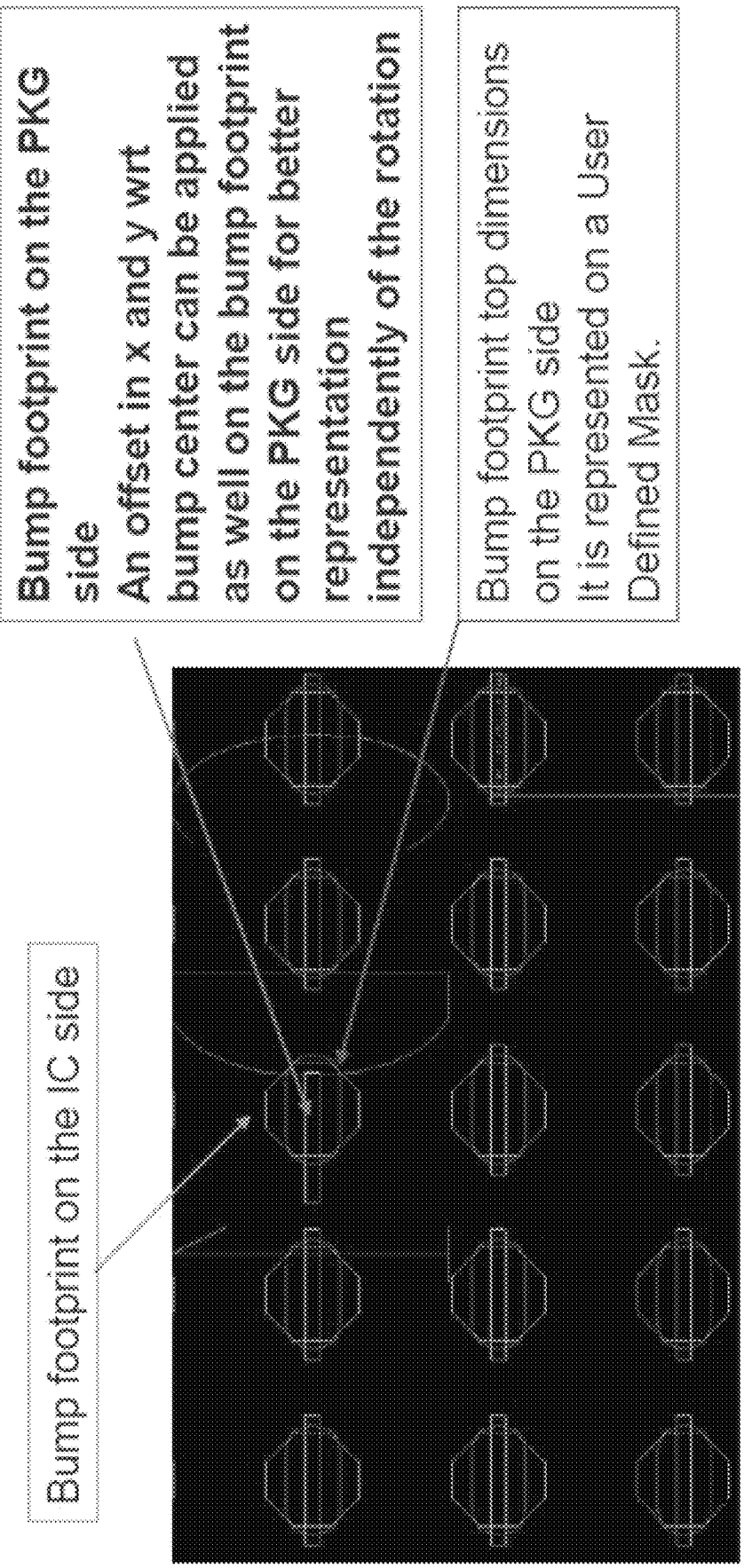
FIG. 27 is a graphical user interface in accordance with an embodiment of the present disclosure.

Referring now to FIG. 26, an embodiment consistent with layout display process 10 showing thermal shrink versus optimal shrink is provided. FIG. 27 shows an example with bump footprint on the IC side and bump footprint on the package side. This example shows an offset in x and y with respect to the bump center may be applied. An offset in x and y on the bump footprint on the package side as well for better representation independently of the rotation.

Figure 28:
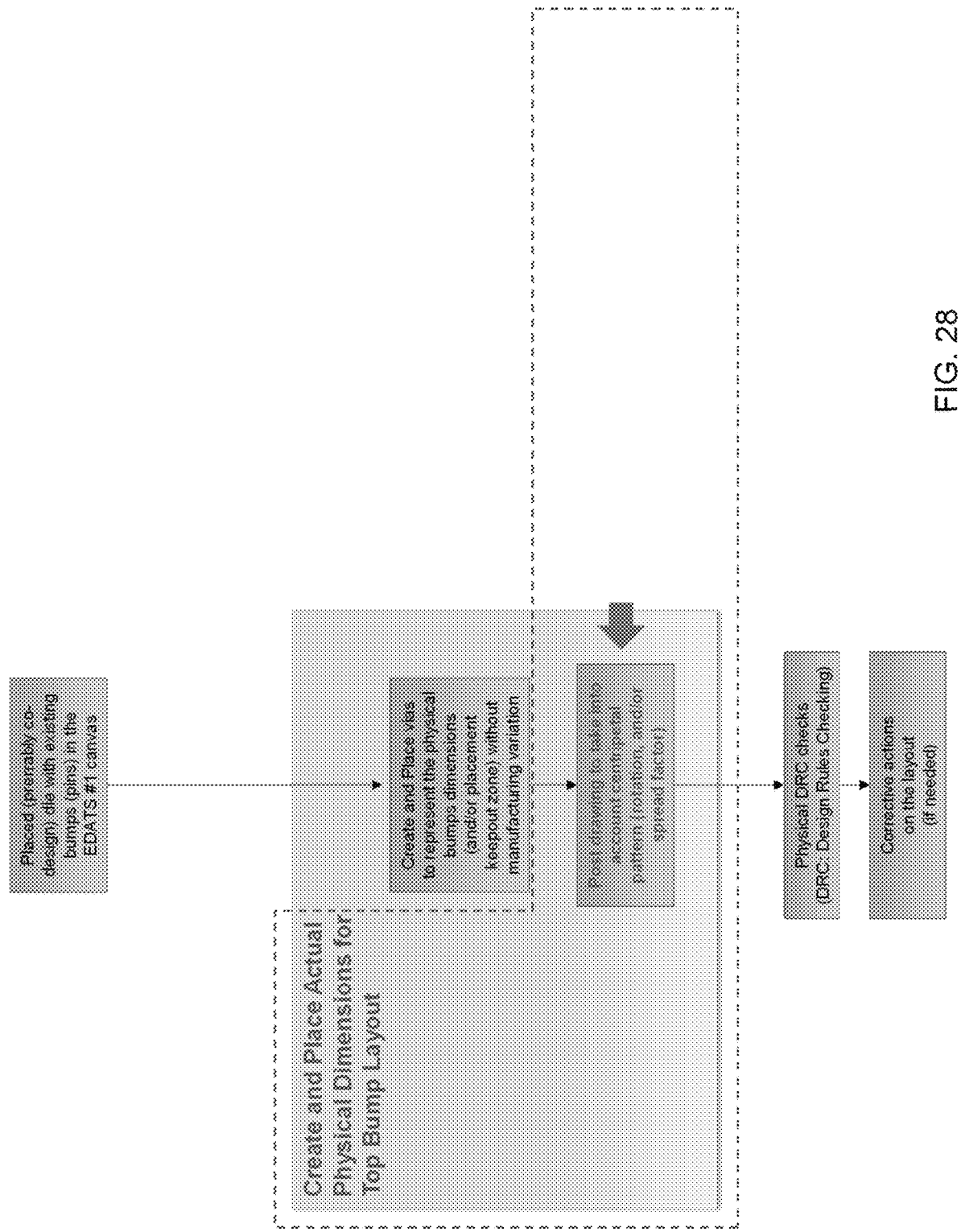
FIG. 28 is a flowchart depicting operations incorporating the layout display process in accordance with an embodiment of the present disclosure.
Figure 29:
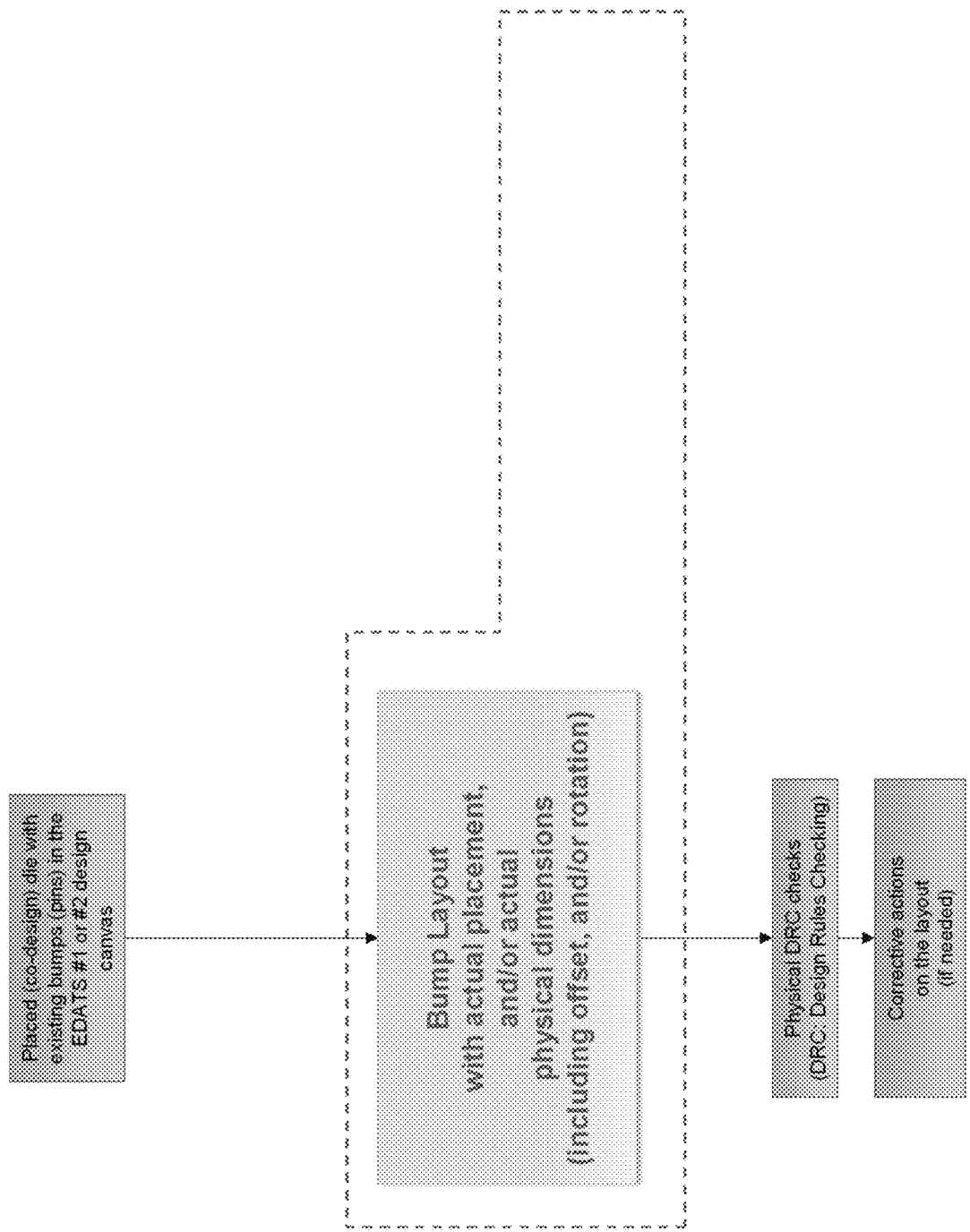
FIG. 29 is a flowchart depicting operations incorporating the layout display process in accordance with an embodiment of the present disclosure.

Referring now to FIGS. 28-29, flowcharts showing embodiments of layout display process 10 are provided. Layout display process 10 may include placing a die with existing bumps (e.g. pins) in a canvas such as EDA application 20 shown in FIG. 1 (an example bump footprint on the package side is shown at the bottom of FIG. 4). The process may then create and place vias to represent the physical bumps dimensions (and/or placement keepout zone) without manufacturing variations (an example physical bumps dimension is shown in the middle of FIG. 4). The process may also include creating and placing actual physical dimensions for the top bump layout. This may include displaying a drawing to account for centripetal pattern (e.g. rotation and/or spread factor), examples of which are provided in FIGS. 21-22. Physical design rule checks may then be performed and corrective actions may be performed on the layout if necessary.

It should be noted that teachings of the present disclosure may be applied to other manufacturing patterns, or objects by adapting the algorithm, thanks to options, used to place the objects at their actual expected manufacturing location. For example, in the implemented code the center of the die may be taken by default as reference to calculate the unit vector, but that origin can be set at another preferred location. Additionally and/or alternatively, a different rotation may be applied to the objects. The spread factor is typically positive, but negative values can be applied as well. The actual bump dimensions and placement representation is not limited to the methods described in this document. Embodiments included herein may be represented as a shape in a padstack (e.g. EDA application 20, and SiP Layout flows with co-design dies), or shape belonging to another object (e.g. via in SiP Layout flow), etc.

In some embodiments, some or all of layout display process 10 may be used to generate a computer readable storage medium, which may be used to fabricate or manufacture a physical electronic device, including but not limited to, those discussed herein. For example, once layout display process 10 has been utilized and the electronic design verified, the computer readable storage medium, which may include the results of layout display process 10, may be used as the basis for the manufacture of circuitry such as the physical electronic devices described herein.

Accordingly, embodiments of layout display process 10 may represent the bump layout with actual placement, and/or actual physical dimensions (e.g., including offset, and/or rotation) as expected after variations from the manufacturing steps (e.g., thermal, centrifuge force, etc.). In some embodiments, a transformation may be applied to the bumps layout according to the design intent and the manufacturing variations, taking into account a spread (or shrink) factor, and/or a rotation of the bumps towards a given reference point (by default the center of the die). In some embodiments, a thermal shrink factor may be added to the PCell representing the die to take into account the manufacturing variations in the layout. This all results in a significant technological benefit over existing systems.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in design for manufacturing associated with a die or package comprising:

providing, using a processor, an electronic design;
displaying, at a graphical user interface, a layout associated with the electronic design;
determining an expected thermal or centrifuge force manufacturing variation associated with the electronic design;
allowing a user to insert, at the graphical user interface prior to signoff, a copper pillar bump or solder bump on the layout based upon, at least in part, the determined expected thermal or centrifuge force manufacturing variation, wherein inserting includes determining an actual physical dimension of the copper pillar bump or solder bump on the layout and wherein the actual physical dimension includes at least one of offset, rotation, spread, or shrink factor; and
displaying the copper pillar bump or the solder bump on the layout at the graphical user interface.

2. The computer-implemented method of claim 1, wherein displaying the layout or displaying the copper pillar bump or the solder bump is associated with a die layout.

3. The computer-implemented method of claim 1, wherein displaying the layout or displaying the copper pillar bump or the solder bump is associated with a package layout.

4. The computer-implemented method of claim 1, wherein inserting occurs after a physical verification step has identified one or more design rules violations.

5. The computer-implemented method of claim 1, wherein inserting includes determining an actual placement of the copper pillar bump or solder bump on the layout.

6. A system for use in design for manufacturing associated with a die or package comprising:
a computing device having at least one processor configured to provide an electronic design and display, at a graphical user interface, a layout associated with the electronic design, the at least one processor configured to determine an expected thermal or centrifuge force manufacturing variation associated with the electronic design, the at least one processor configured to allow a user to insert, at the graphical user interface prior to signoff, a copper pillar bump or solder bump on the layout based upon, at least in part, the determined expected thermal or centrifuge force manufacturing variation, wherein inserting includes determining an actual physical dimension of the copper pillar bump or solder bump on the layout and wherein the actual physical dimension includes at least one of offset, rotation, spread, or shrink factor, the at least one processor further configured to display the copper pillar bump or the solder bump on the layout at the graphical user interface.

7. The system of claim 6, wherein displaying the layout or displaying the copper pillar bump or the solder bump is associated with a die layout.

8. The system of claim 6, wherein displaying the layout or displaying the copper pillar bump or the solder bump is associated with a package layout.

9. The system of claim 6, wherein inserting occurs after a physical verification step has identified one or more design rules violations.

10. The system of claim 6, wherein inserting includes determining an actual placement of the copper pillar bump or solder bump on the layout.

11. A non-transitory computer readable medium having stored thereon instructions that when executed by a processor result in one or more operations for use in design for manufacturing associated with a die or package, the operations comprising:
providing, using a processor, an electronic design;
displaying, at a graphical user interface, a layout associated with the electronic design;
determining an expected thermal or centrifuge force manufacturing variation associated with the electronic design;
allowing a user to insert, at the graphical user interface prior to signoff, a copper pillar bump or solder bump on the layout based upon, at least in part, the determined expected thermal or centrifuge force manufacturing variation, wherein inserting includes determining a physical dimension of the copper pillar bump or solder bump on the layout and wherein the physical dimension includes at least one of offset, rotation, spread, or shrink factor; and
displaying the copper pillar bump or the solder bump on the layout at the graphical user interface.

12. The non-transitory computer readable medium of claim 1, wherein displaying the layout or displaying the copper pillar bump or the solder bump is associated with a die layout.

13. The non-transitory computer readable medium of claim 11, wherein displaying the layout or displaying the copper pillar bump or the solder bump is associated with a package layout.

14. The non-transitory computer readable medium of claim 11, wherein inserting occurs after a physical verification step has identified one or more design rules violations.

* * * * *